(12) United States Patent
Mhun et al.

(10) Patent No.: US 10,162,449 B2
(45) Date of Patent: Dec. 25, 2018

(54) MOBILE TERMINAL AND CONTROLLING METHOD THEREOF

(71) Applicants: Yunjueng Mhun, Seoul (KR); Jiyen Son, Seoul (KR); Sanghyun Eim, Seoul (KR); Hyoungkeun Kim, Seoul (KR); Namki Kim, Seoul (KR); Choonjae Lee, Seoul (KR)

(72) Inventors: Yunjueng Mhun, Seoul (KR); Jiyen Son, Seoul (KR); Sanghyun Eim, Seoul (KR); Hyoungkeun Kim, Seoul (KR); Namki Kim, Seoul (KR); Choonjae Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 63 days.

(21) Appl. No.: 14/320,866

(22) Filed: Jul. 1, 2014

(65) Prior Publication Data

US 2015/0022469 A1    Jan. 22, 2015

(30) Foreign Application Priority Data

Jul. 17, 2013 (KR) .................. 10-2013-0084427
Jul. 17, 2013 (KR) .................. 10-2013-0084428

(51) Int. Cl.
*G06F 3/041* (2006.01)
*H04M 1/22* (2006.01)
(Continued)

(52) U.S. Cl.
CPC ............ *G06F 3/0416* (2013.01); *H04M 1/22* (2013.01); *H04M 1/72563* (2013.01);
(Continued)

(58) Field of Classification Search
CPC .... G06F 3/017; G06F 3/04883; G06F 3/0487; G06F 3/0488; G06F 3/04886;
(Continued)

(56) References Cited

U.S. PATENT DOCUMENTS 6,374,277 B2 * 4/2002 Vong .............................. 708/112
2007/0075965 A1   4/2007 Huppi et al.
(Continued)

FOREIGN PATENT DOCUMENTS

EP          2 418 830 A1    2/2012
WO     WO 2012/054005       4/2012

OTHER PUBLICATIONS

European Search Report dated Dec. 11, 2014 issued in Application No. 14 176 436.5.
(Continued)

*Primary Examiner* — William Lu
(74) *Attorney, Agent, or Firm* — Ked & Associates, LLP

(57) ABSTRACT

A mobile terminal and controlling method thereof are provided, in which a face-down mode may be supported. The mobile terminal may include a first sensing device that detects a face-down mode of the mobile terminal, a second sensing device that detects a user designated direction in which the vicinity of the mobile terminal, a touchscreen, and a controller controlling a prescribed portion of the touchscreen corresponding to the detected user designated direction so that the touchscreen emits light in response to a preset event occurring in the face-down mode.

12 Claims, 38 Drawing Sheets

(51) Int. Cl.
*H04M 1/725* (2006.01)
*H04M 19/04* (2006.01)

(52) U.S. Cl.
CPC ..... *H04M 1/72569* (2013.01); *H04M 19/048* (2013.01); *H04M 2250/12* (2013.01)

(58) Field of Classification Search
CPC ........... G06F 2203/04808; G06F 3/041; G06F 3/042; G06F 3/0421; G06F 3/0423; G06F 3/0425; G06F 3/0426; G06F 3/0428
See application file for complete search history.

(56) References Cited

U.S. PATENT DOCUMENTS

| | | | | |
|---|---|---|---|---|
| 2008/0138031 | A1* | 6/2008 | Fujiwara | G11B 27/36 386/343 |
| 2008/0280642 | A1* | 11/2008 | Coxhill | G06F 1/1626 455/556.1 |
| 2009/0066857 | A1* | 3/2009 | Camp, Jr. | H04N 9/3173 348/744 |
| 2009/0153490 | A1* | 6/2009 | Nymark | H04M 1/72519 345/169 |
| 2010/0035582 | A1* | 2/2010 | Wingett | H04M 1/22 455/412.2 |
| 2010/0073620 | A1* | 3/2010 | Yamaguchi | G02F 1/133305 349/160 |
| 2010/0086112 | A1* | 4/2010 | Jiang | H04M 3/42042 379/93.23 |
| 2010/0088195 | A1* | 4/2010 | Bellamy | G06Q 30/0601 705/26.1 |
| 2010/0182136 | A1* | 7/2010 | Pryor | G01F 23/292 340/425.5 |
| 2010/0207895 | A1* | 8/2010 | Joung | G06F 3/016 345/173 |
| 2011/0003614 | A1* | 1/2011 | Langereis | G01S 15/06 455/550.1 |
| 2011/0041101 | A1* | 2/2011 | Choi | G06F 3/0488 715/863 |
| 2011/0143817 | A1* | 6/2011 | Asabu | G06F 1/1677 455/566 |
| 2011/0202866 | A1* | 8/2011 | Huang | G06F 3/0482 715/779 |
| 2011/0280497 | A1* | 11/2011 | Berger | G06F 17/30274 382/306 |
| 2011/0319141 | A1* | 12/2011 | Miwa | H04M 9/04 455/567 |
| 2012/0204191 | A1* | 8/2012 | Shia | G06Q 10/10 719/318 |
| 2012/0235963 | A1* | 9/2012 | Oshinome | G09G 5/00 345/204 |
| 2012/0323933 | A1* | 12/2012 | He | G06Q 10/107 707/749 |
| 2012/0331548 | A1* | 12/2012 | Tseng | G06F 21/31 726/19 |
| 2013/0162688 | A1* | 6/2013 | Matsuoka | H04N 9/3188 345/682 |
| 2013/0222231 | A1* | 8/2013 | Gardenfors | G06F 3/03 345/156 |
| 2013/0290879 | A1* | 10/2013 | Greisson | H04M 1/72522 715/764 |
| 2013/0294443 | A1* | 11/2013 | Kahn | H04L 65/1073 370/352 |
| 2013/0295898 | A1* | 11/2013 | Kader | H04W 4/16 455/415 |
| 2014/0080546 | A1* | 3/2014 | Gorilovsky | G06F 1/1626 455/566 |
| 2014/0146304 | A1* | 5/2014 | Almalki | G01N 21/55 356/51 |
| 2014/0184471 | A1* | 7/2014 | Martynov | G06F 3/1423 345/1.2 |
| 2014/0292998 | A1* | 10/2014 | Toga | H04M 1/72569 348/14.02 |
| 2016/0066298 | A1* | 3/2016 | Cho | H04W 68/02 455/414.1 |

OTHER PUBLICATIONS

European Search Report dated Jan. 4, 2017 issued in Application No. 16188062.0.

* cited by examiner (b)

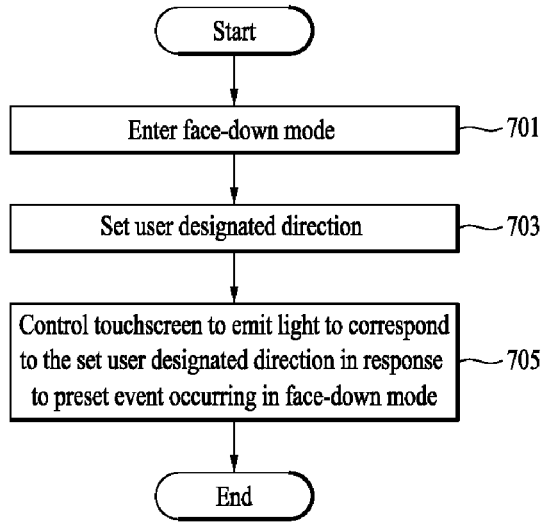
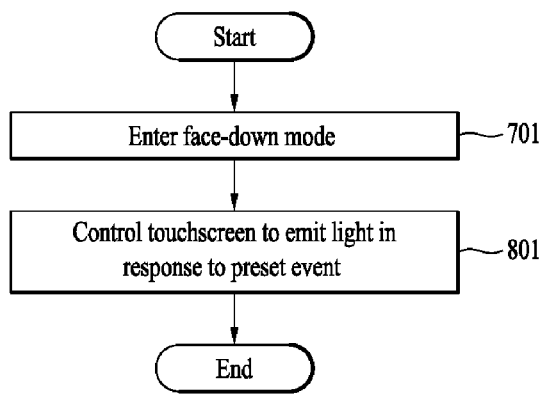

(c)

FIG. 28A
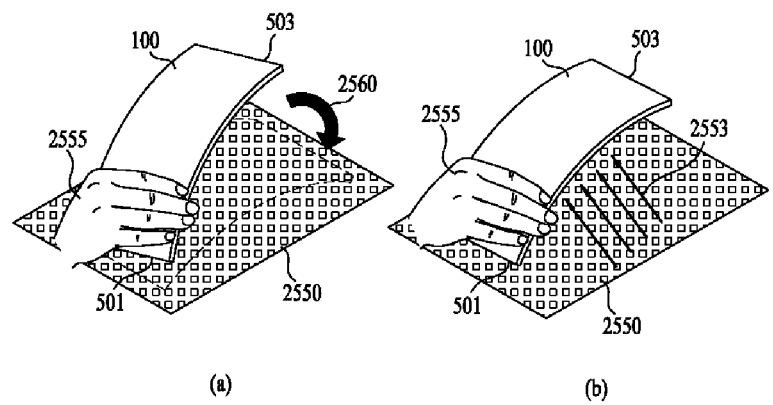
FIG. 28B
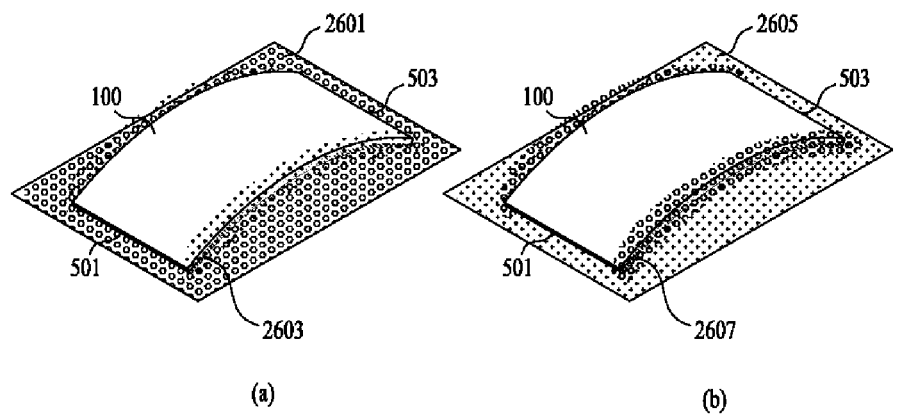
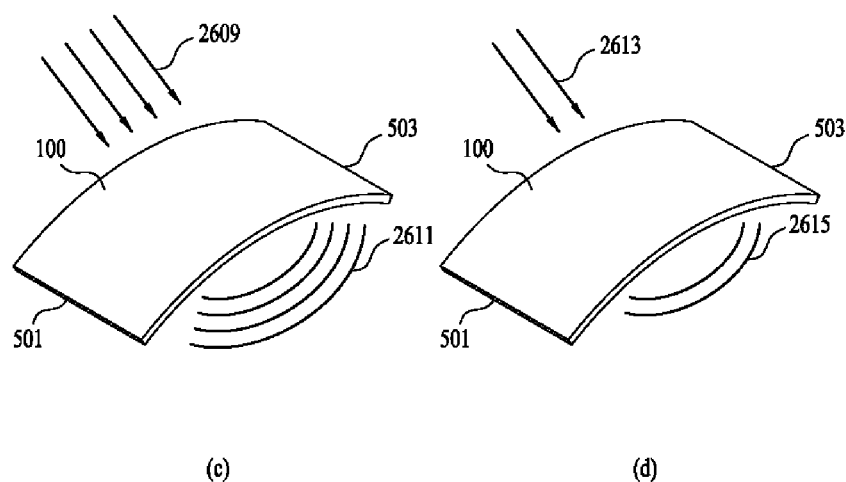

MOBILE TERMINAL AND CONTROLLING METHOD THEREOF

CROSS-REFERENCE TO RELATED APPLICATION(S)

This application claims priority under 35 U.S.C. § 119 to Korean Application No. 10-2013-0084428 filed on Jul. 17, 2013 and Korean Application No. 10-2013-0084427 filed on Jul. 17, 2013, whose entire disclosures are hereby incorporated by reference.

BACKGROUND

1. Field

This relates to a mobile terminal, and more particularly, to a mobile terminal and controlling method thereof.

2. Background

Generally, terminals may be classified into mobile terminals and stationary terminals based on a level of mobility thereof. Mobile terminals may be further classified into handheld terminals and vehicle mount terminals based on availability for hand-carry.

A mobile terminal may perform various functions, such as, for example, data and voice communications, capturing images and video via a camera, recording audio, playing music files and outputting music via a speaker system, and displaying images and video on a display. Some terminals may include additional functionality which supports game playing, while other terminals may also be configured as multimedia players. Some mobile terminals may also be configured to receive broadcast and multicast signals which permit viewing of content, such as videos and television programs.

BRIEF DESCRIPTION OF THE DRAWINGS

The embodiments will be described in detail with reference to the following drawings in which like reference numerals refer to like elements wherein:

FIG. 7 is a flowchart of an operation of a mobile terminal according to one embodiment as broadly described herein;

FIG. 8 is a flowchart of an operation of a mobile terminal according to another embodiment as broadly described herein;

FIG. 28A illustrates a method for a mobile terminal to recognize a color of a floor surface, according to one embodiment as broadly described herein;

FIG. 28B illustrates a process for a display of a mobile terminal to output light by adjusting color of the light, brightness of the light and other factors, depending on an ambient light, according to one embodiment as broadly described herein;

DETAILED DESCRIPTION

In the following detailed description, reference is made to the accompanying drawing figures which form a part hereof, and which show by way of illustration various exemplary embodiments. It is to be understood by those of ordinary skill in this technological field that other embodiments may be utilized, and structural, electrical, as well as procedural changes may be made without departing from the scope as broadly described herein. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

Embodiments as broadly described herein be applicable to a various types of terminals. Examples of such terminals may include mobile terminals, such as mobile phones, user equipment, smart phones, mobile computers, digital broadcast terminals, personal digital assistants, portable multimedia players (PMP) and navigators.

Figure 1:
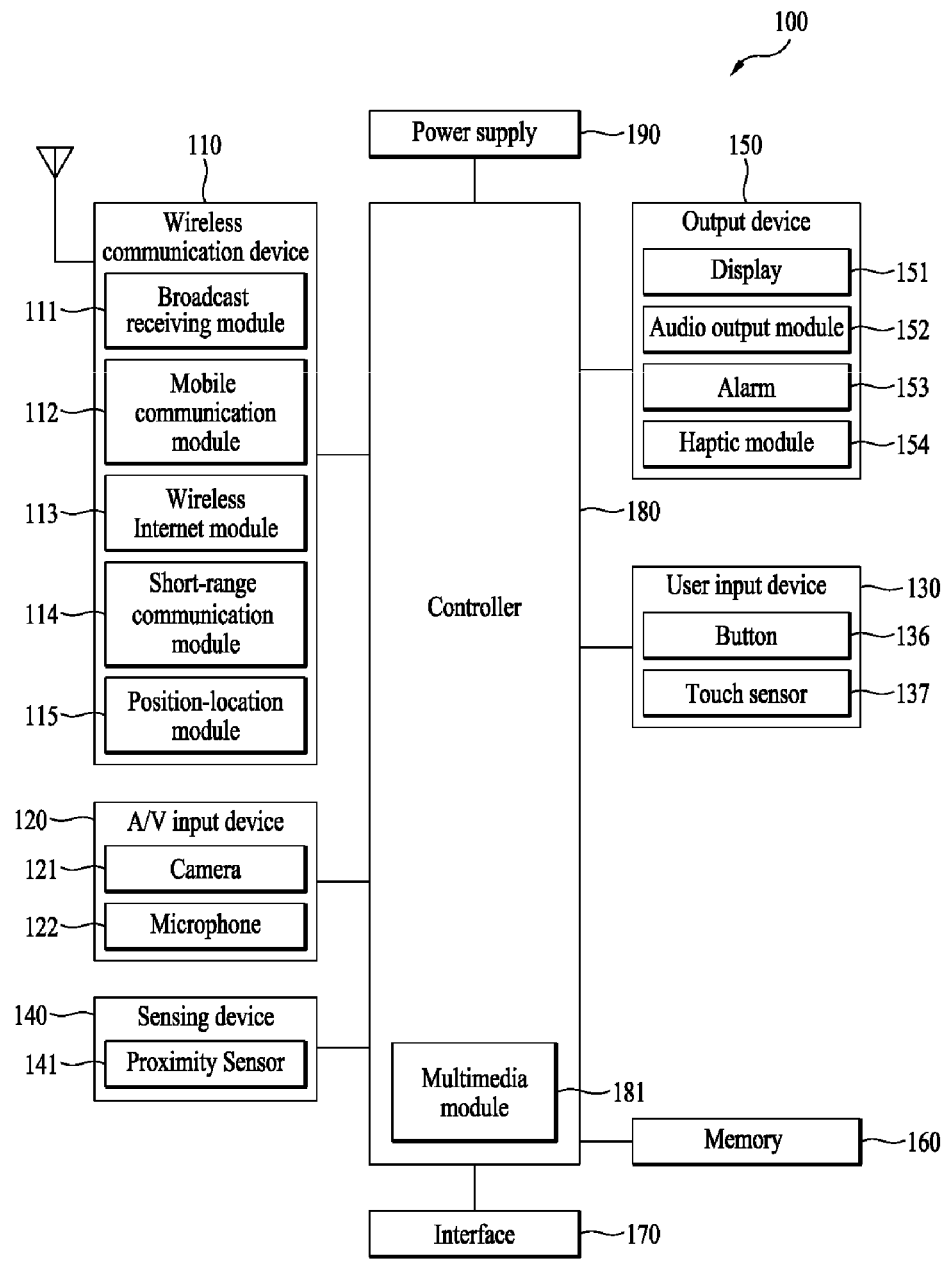
FIG. 1 is a block diagram of a mobile terminal according to one embodiment as broadly described herein.

FIG. 1 is a block diagram of a mobile terminal 100 in accordance with an embodiment as broadly described herein, including a wireless communication device 110, an A/V (audio/video) input device 120, a user input device 130, a sensing device 140, an output device 150, a memory 160, an interface device 170, a controller 180, and a power supply 190. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

The wireless communication device 110 may include one or more components which permit wireless communication between the mobile terminal 100 and a wireless communication system or network within which the mobile terminal 100 is located. For instance, the wireless communication device 110 may include a broadcast receiving module 111, a mobile communication module 112, a wireless internet module 113, a short-range communication module 114, and a position-location module 115.

The broadcast receiving module 111 receives a broadcast signal and/or broadcast associated information from an external broadcast managing server via a broadcast channel.

The broadcast channel may include, for example, a satellite channel or a terrestrial channel.

The broadcast managing server may refer to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, or a data broadcast signal, among others. If desired, the broadcast signal may further include a broadcast signal combined with a TV or radio broadcast signal.

At least two broadcast receiving modules 111 may be provided with the mobile terminal 100 in pursuit of simultaneous reception of at least two broadcast channels or broadcast channel switching facilitation.

The broadcast associated information includes information associated with a broadcast channel, a broadcast program, a broadcast service provider, etc. And, the broadcast associated information may be provided via a mobile communication network. In this case, the broadcast associated information may be received by the mobile communication module 112.

The broadcast associated information may be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. For example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 may be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology may include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to provide for wireless internet access via the mobile communication network may be considered one type of mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

The GPS module 115 may precisely calculate current 3-dimensional position information based on at least one of longitude, latitude and altitude and direction (or orientation) by calculating distance information and precise time information from at least three satellites and then applying triangulation to the calculated information. Location and time information may be calculated using three satellites, and errors of the calculated location position and time information may then be amended using another satellite. The GPS module 115 may be able to calculate speed information by continuously calculating a real-time current location.

Referring to FIG. 1, the audio/video (A/V) input device 120 is configured to provide audio or video signal input to the mobile terminal 100. As shown, the A/V input device 120 includes a camera 121 and a microphone 122. The camera 121 receives and processes image frames of still pictures or video, which are obtained by an image sensor in a video call mode or a photographing mode. The processed image frames may be displayed on the display 151.

The image frames processed by the camera 121 may be stored in the memory 160 or may be externally transmitted via the wireless communication device 110. Optionally, at least two cameras 121 may be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 may include assorted noise removing algorithms to remove noise generated in the course of receiving the external audio signal.

The user input device 130 generates input data responsive to user manipulation of an associated input device or devices. Examples of such devices include a keypad, a dome switch, a touchpad (e.g., static pressure/capacitance), a jog wheel, a jog switch, and other such devices.

The sensing device 140 provides sensing signals for controlling operations of the mobile terminal 100 using status measurements of various aspects of the mobile terminal. For instance, the sensing device 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100. As an example, when the mobile terminal 100 is a slide-type mobile terminal, the sensing device 140 may sense whether a sliding portion of the mobile terminal is open or closed. Other examples include the sensing device 140 sensing the presence or absence of power provided by the power supply 190, the presence or absence of a coupling or other connection between the interface device 170 and an external device. The sensing device 140 may include a proximity sensor 141.

Moreover, the sensing device 140 may include a gyro sensor for sensing a horizontal state of the terminal, an accelerometer sensor and/or a photosensor for sensing color, brightness and the like of an ambient light of the terminal. In the photosensor, a sensor for sensing a color of a light may include an RGB sensor and a sensor for sensing a brightness of a light may include an illumination sensor, for example. The sensing device 140 may detect a sound generated from an ambience or outer surface of the mobile terminal 100. In particular, the sensing device 140 may sense a direction in which the corresponding sound is generated. In order to detect a sound generated from an ambient environment or outer surface of the mobile terminal 100, the sensing device 140 may be located at an inside of each side configuring the mobile terminal 100 or at several places of a rear side of the mobile terminal 100. Such a sound or audio sensing operation may be performed by the microphone 122 if necessary.

The output device 150 generates outputs relevant to the senses of sight, hearing, touch and the like. The output device 150 includes the display 151, an audio output module 152, an alarm device 153, a haptic module 154, a projector module 155 and other such components.

The display 151 may visually display (output) information associated with the mobile terminal 100. For instance, if the mobile terminal is operating in a phone call mode, the display may provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be, for example, a liquid crystal display (LCD), a thin film transistor-liquid crystal display (TFT-LCD), an organic light-emitting diode display (OLED), a flexible display or a three-dimensional display. The mobile terminal 100 may include one or more of such displays.

Some of the above displays may be implemented in a transparent or optical transmittive type, which may be referred to as a transparent display. For example, a transparent display may be a TOLED (transparent OLED) or the like. A rear configuration of the display 151 may be implemented in the optical transmittive type as well. In this configuration, a user may be able to see an object positioned to a rear of a terminal body via the area occupied by the display 151 of the terminal body.

At least two displays 151 may be provided to the mobile terminal 100 in accordance with the implemented configuration of the mobile terminal 100. For instance, a plurality of displays may be arranged on a single face of the mobile terminal 100, spaced apart from each other or formed as one body. Alternatively, a plurality of displays may be arranged on different faces of the mobile terminal 100.

In a case in which the display 151 and a sensor for detecting a touch action (hereinafter called 'touch sensor') as formed by a mutual layer structure (hereinafter called 'touchscreen'), the display 151 may also function as an input device as well as an output device. In this case, the touch sensor may be configured as a touch film, a touch sheet, a touchpad or the like.

The touch sensor may convert a pressure applied to a specific portion of the display 151 or a variation of a capacitance generated from a specific portion of the display 151 to an electric input signal. Moreover, the touch sensor may detect a pressure of a touch as well as a touched position or size.

If a touch input is applied to the touch sensor, signal(s) corresponding to the touch are transferred to a touch controller. The touch controller processes the signal(s) and then transfers the processed signal(s) to the controller 180. Therefore, the controller 180 may know whether a prescribed portion of the display 151 is touched.

Referring to FIG. 1, a proximity sensor (141) may be provided in an internal area of the mobile terminal 100 enclosed by the touchscreen or around the touchscreen. The proximity sensor may detect a presence or non-presence of an object approaching a prescribed detecting surface or an object existing around the proximity sensor using an electromagnetic field strength or infrared ray without mechanical contact. Hence, the proximity sensor may be more durable than a contact type sensor and may have more utility than the contact type sensor.

The proximity sensor may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In a case in which the touchscreen includes the electrostatic capacity proximity sensor, it may detect the proximity of a pointer using a variation of electric field according to the proximity of the pointer. In this case, the touchscreen (touch sensor) may be considered the proximity sensor.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern may be output to the touchscreen.

The audio output module 152 functions in various modes including a call-receiving mode, a call-placing mode, a recording mode, a voice recognition mode, a broadcast reception mode and the like to output audio data which is received from the wireless communication device 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm 153 may output a signal for announcing the occurrence of a particular event associated with the mobile terminal 100. Typical events include a call received event, a message received event and a touch input received event. The alarm 153 may output a signal for announcing the event occurrence by way of vibration as well as video or audio signal. The video or audio signal may be output via the display 151 or the audio output device 152. Hence, the display 151 or the audio output module 152 may be regarded as a part of the alarm 153.

The haptic module 154 generates various tactile effects that may be sensed by a user. Vibration is a representative one of the tactile effects generated by the haptic module 154. Strength and pattern of the vibration generated by the haptic module 154 are controllable. For instance, different vibrations may be outputted in a manner of being synthesized together or may be outputted in sequence.

The haptic module 154 may generate various tactile effects as well as the vibration. For instance, the haptic module 154 may generate an effect attributed to an arrangement of pins vertically moving against a contact skin surface, an effect attributed to an injection/suction power of air though an injection/suction hole, an effect attributed to a skim over a skin surface, an effect attributed to contact with an electrode, an effect attributed to an electrostatic force, an effect attributed to the representation of hold/cold sense using an endothermic or exothermic device and the like.

The haptic module 154 may enable a user to sense the tactile effect through a muscle sense of a finger, arm or the like as well as to transfer the tactile effect through direct contact. Optionally, at least two haptic modules 154 may be provided to the mobile terminal 100 in accordance with the corresponding configuration type of the mobile terminal 100.

The projector module 155 may perform an image projector function using the mobile terminal 100. The projector module 155 may display an image, which is identical to or partially different at least from the image displayed on the display 151, on an external screen or wall according to a control signal of the controller 180.

In particular, the projector module 155 may include a light source generating light (e.g., laser) for projecting an image externally, an image producing device for producing an image to output externally using the light generated from the light source, and a lens for enlarging to output the image externally in a predetermined focus distance. The projector module 155 may also include a device for adjusting an image projected direction by mechanically moving the lens or the whole module.

The projector module 155 may be classified into a CRT (cathode ray tube) module, an LCD (liquid crystal display) module, a DLP (digital light processing) module or the like according to a device type of a display. In particular, the DLP module is operated by the mechanism of enabling the light generated from the light source to reflect on a DMD (digital micro-mirror device) chip and may be advantageous for the downsizing of the projector module 151.

The projector module 155 may be provided in a length direction of a lateral, front or backside direction of the mobile terminal 100. The projector module 155 may be provided at any portion of the mobile terminal 100 according to the necessity thereof.

The memory 160 may store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. A recent use history or a cumulative use frequency of each data (e.g., use frequency for each phonebook, each message or each multimedia) may be stored in the memory 160. Moreover, data for various patterns of vibration and/or sound outputted in case of a touch input to the touchscreen may be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. The mobile terminal 100 may operate in association with web storage for performing a storage function of the memory 160 on the Internet.

The interface device 170 may couple the mobile terminal 100 with external devices. The interface device 170 receives data from the external devices or is supplied with the power and then transfers the data or power to the respective elements of the mobile terminal 100 or enables data within the mobile terminal 100 to be transferred to the external devices. The interface device 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and may include User Identify Module (UIM), Subscriber Identify Module (SIM), Universal Subscriber Identity Module (USIM) and/or the like. A device having the identity module (hereinafter called 'identity device') may be manufactured as a smart card. Therefore, the identity device is connectible to the mobile terminal 100 via the corresponding port.

When the mobile terminal 110 is connected to an external cradle, the interface device 170 may form a passage for supplying the mobile terminal 100 with power from the cradle or a passage for delivering various command signals inputted from the cradle by a user to the mobile terminal 100. Each of the various command signals inputted from the cradle or the power may operate as a signal enabling the mobile terminal 100 to recognize that it is correctly loaded in the cradle.

The controller 180 may control the overall operation of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 may perform a pattern (or image) recognizing process for recognizing a writing input and a picture drawing input carried out on the touchscreen as characters or images, respectively.

The power supply 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes may be implemented with a software application written in any suitable programming language and may be stored in memory such as the memory 160, and executed by a controller or processor, such as the controller 180.

Figure 2:
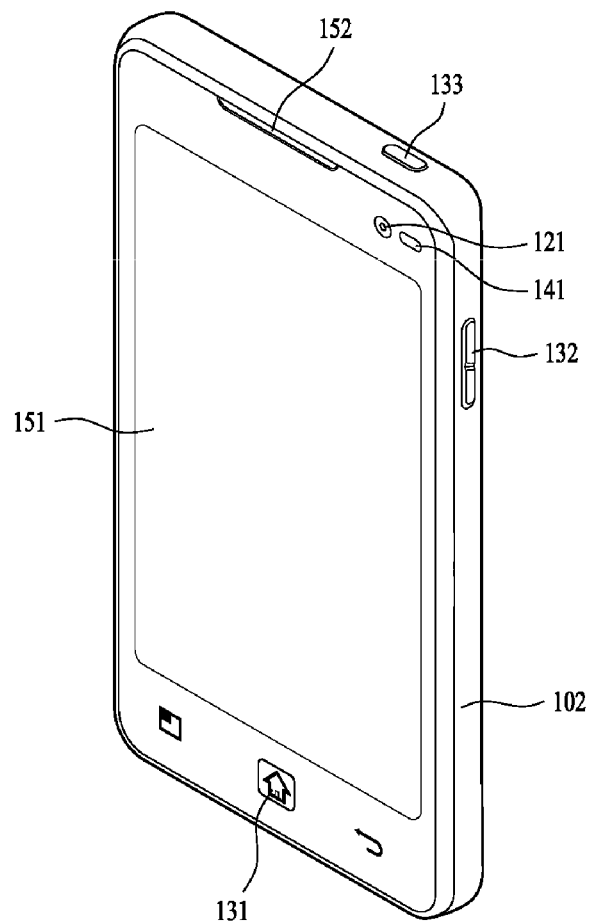
FIG. 2 is a front perspective view of a mobile terminal according to one embodiment as broadly described herein.

FIG. 2 is a front perspective view of a mobile terminal according to one embodiment as broadly described herein.

The exemplary mobile terminal 100 shown in FIG. 2 has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case may be divided into a front case 101 and a rear case 102. Various electric/electronic parts are loaded in a space provided between the front and rear cases 101 and 102. Optionally, at least one middle case may be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output device 152, a camera 121, sensor(s) 141, user input devices 131 and 132, a microphone 122, an interface 170 and the like may be provided to the terminal body, and more particularly, to the front case 101.

The display 151 occupies most of a main face of the front case 101. The audio output device 152 and the camera 121 are provided at an area adjacent to one of the end portions of the display 151, while the user input device 131 and the microphone 122 are provided at area adjacent to the other end portion of the display 151. The user input device 132 and the interface 170 can be provided at lateral sides of the front and rear cases 101 and 102.

The one of the components 131/132 of the input device 130 is manipulated to receive a command for controlling an operation of the terminal 100. In particular, the input device 130 may include a plurality of manipulating units 131 and 132. The manipulating units 131 and 132 may be referred to as a manipulating portion and may enable a user to perform a manipulation action by experiencing a tactile feeling.

Content inputted by the first or second manipulating unit 131 or 132 may be diversely set. For instance, such a command as start, end, scroll and the like is inputted to the first manipulating unit 131. And, a command for a volume adjustment of sound outputted from the audio output device 152, a command for a switching to a touch recognizing mode of the display 151 or the like may be inputted to the second manipulating unit 132.

Figure 3:
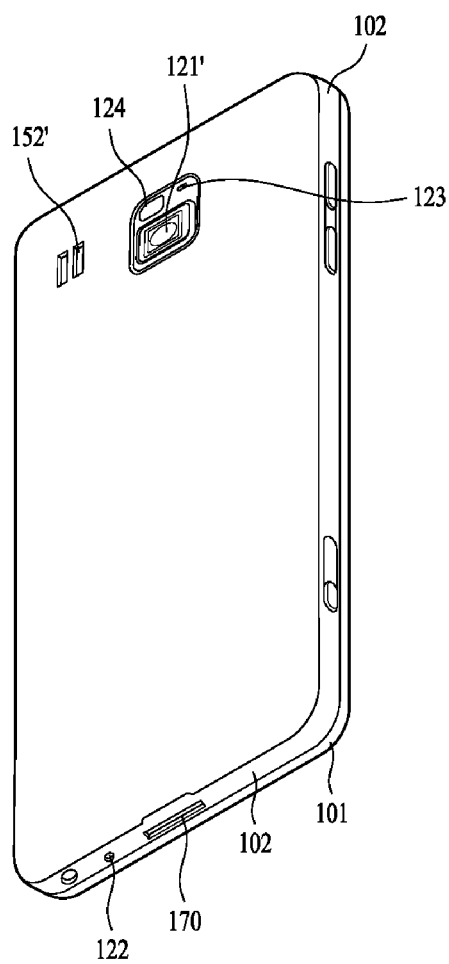
FIG. 3 is a rear perspective view of a mobile terminal according to one embodiment as broadly described herein.

FIG. 3 is a perspective diagram of a backside of the terminal shown in FIG. 2.

Referring to FIG. 3, another camera 121' may be additionally provided at a backside of the terminal body, and more particularly, at the rear case 102. The second camera 121' has a photographing direction that is substantially opposite to that of the first camera 121 shown in FIG. 2 and may have pixels differing from those of the first camera 121.

For example, the first camera 121 may have a relatively pixel level, sufficient low to capture and transmit a picture of user's face for a video call, while the second camera 121' may have a relatively high pixel level for capturing a general subject for photography without transmitting the captured subject. Each of the cameras 121 and 121' may be installed at the terminal body so as to be rotated or popped up.

A flash 123 and a mirror 124 are additionally provided adjacent to the second camera 121'. The flash 123 projects light toward a subject when photographing the subject using the second camera 121'. When a user attempts to take a picture of the user (self-photography) using the camera 121', the mirror 124 enables the user to view user's face reflected by the mirror 124.

An additional audio output device 152' may be provided to the backside of the terminal body. The second audio output device 152' may implement a stereo function together with the first audio output device 152 shown in FIG. 2 and may be used for implementation of a speakerphone mode in talking over the terminal.

A broadcast signal receiving antenna may be additionally provided at the lateral side of the terminal body as well as an antenna for communication or the like. The antenna constructing a portion of the broadcast receiving module 111 shown in FIG. 1 may be retractably provided in the terminal body.

A power supply 190 for supplying a power to the terminal 100 may be provided in the terminal body, and be configured to be built within the terminal body. Alternatively, the power supply 190 may be detachably connected to the terminal body.

A touchpad for detecting a touch may be additionally provided at the rear case 102. The touchpad may be a light transmittive type like the display 151. In this case, if the display 151 is configured to output visual information from both its faces, it is able to recognize visual information via the touchpad as well. The information outputted from both of the faces may be entirely controlled by the touchpad. Alternatively, a display may be provided to the touchpad so that a touchscreen may be provided at the rear case 102 as well.

The touchpad is activated by interconnecting with the display 151 of the front case 101. The touchpad may be provided in parallel with and at a rear of the display 151. A size of the touchpad may be less than or equal to that of the display 151.

Figure 4:
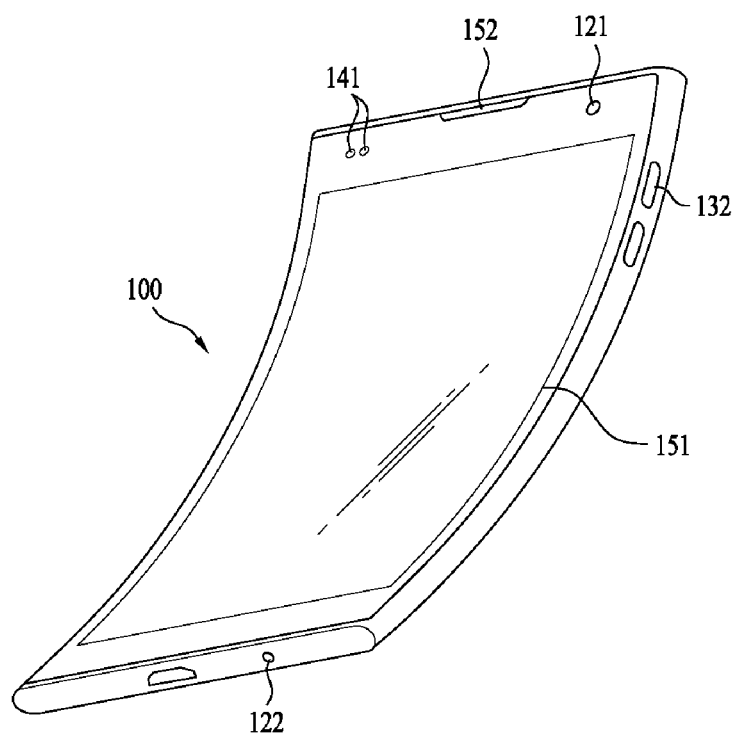
FIG. 4 is a perspective view of a mobile terminal according to another embodiment as broadly described herein.

The mobile terminal 100 according to one embodiment may include a display 151 having a curved shape (i.e., having a curved surface) as shown in FIG. 4. Moreover, a terminal body on which the above-configured display 151 is arranged may be configured to have a curved exterior. For instance, a front side of the terminal body on which the display 151 is arranged may be curved concavely, while a rear side of the terminal body on which the display 151 is not arranged may be curved convexly.

In particular, a front case of the terminal body is curved in a manner that its front side is concave. And, and the display 151 may be curved to correspond to the curved front case. Thus, a front side of the mobile terminal 100 may have a prescribed curvature.

In a case in which the front side of the mobile terminal 100 is planar, when a user places the mobile terminal 100 down on a surface without directly manipulating the mobile terminal 100, the user normally places the mobile terminal 100 with the display 151 facing upward to check an event occurring in the mobile terminal 100. On the other hand, if the user places the mobile terminal 100 with the display 151 facing downward, the user may have difficulty in checking information, which is provided through the display 151, on an event occurring in the mobile terminal 100.

However, if a user places the mobile terminal 100 having a concave front side facing down on a specific surface, the user may check an event occurring in the mobile terminal 100 irrespective of a direction in which the mobile terminal 100 is placed. In particular, when the display 151 faces an upward direction, since the mobile terminal 100 has a prescribed curvature, the mobile terminal 100 vibrates for a while and then enters a horizontal state. Hence, the user may check the information on the event occurring in the mobile terminal 100 by viewing the display 151 like a terminal having a planar front side. On the other hand, if a direction in which the mobile terminal 100 is placed corresponds to a direction in which the display 151 faces down, since both top and bottom ends of the mobile terminal come in contact with the surface, the mobile terminal 100 directly enters the horizontal state. In the horizontal state, since the display 151 has the prescribed curvature, the display 151 arranged on the front side of the mobile terminal 100 is positioned with a prescribed space from the surface on which the mobile terminal 100 is placed, without contacting with the surface.

In doing so, the sensing device 140 may sense the above-mentioned horizontal state of the mobile terminal 100 using the gyro sensor or the accelerometer sensor. In particular, according to one embodiment, the sensing device 140 may recognize a face-down mode. Moreover, since the sensing device 140 may further include a photosensor, if the direction of the mobile terminal corresponds to a direction in which the display 151 faces down, the mobile terminal 100 may detect ambient light that enters the space between the display 151 and the surface. In particular, the sensing device 140 may obtain a brightness, a color and the like of the ambient light through the photosensor. Moreover, when the display 151 emits light, since the light is emitted through the space, information on an event occurring in the mobile terminal 100 may be provided to a user. In particular, the display 151 may output light to a prescribed region. Moreover, since the prescribed region may be relocated, may change a user designated direction in a face-down mode. Besides, when the display 151 partially outputs light, the light may be output in a manner of changing its brightness, color, wavelength and the like.

According to one embodiment, a touch sensor for sensing a user's touch gesture and a proximity sensor for sensing a user's touch gesture may be provided to the rear side of the terminal body of the mobile terminal 100.

And, the mobile terminal 100 according to one embodiment may receive a control command from a user through a visual key displayed on the display 151 without a separate key button provided to the front side of the display 151.

In the following description, controlling methods, which may be implemented in the above-configured mobile terminal 100, according to embodiments as broadly described herein, will be explained with reference to the accompanying drawings.

For clarity and convenience of the following description, assume that a mobile terminal 100 mentioned in the following description includes at least one of the components shown in FIG. 1. In particular, a mobile terminal 100 according to one embodiment may include the display 151, the sensing device 140 and the controller 180. If necessary, the mobile terminal 100 according to one embodiment may also include the proximity sensor 141. If the display 151 includes a touchscreen, implementation of the following embodiments may be further facilitated. Therefore, the following description is made on the assumption that the display 151 includes the touchscreen 151.

In the following description, a face-down mode refers to a state in which the mobile terminal 100 is turned over on a specific surface, such as floor surface or a table surface. In particular, when the touchscreen 151 of the mobile terminal 100 is positioned on a plane so as to face a floor surface, it may be said that the mobile terminal 100 is in face-down mode. The controller 180 may determine whether the mobile terminal 100 is in the face-down mode through the sensing device 140.

In particular, if the controller 180 detects a horizontal state of the mobile terminal 100 for a preset time through the sensing device 140, the controller 180 may detect a turned-over state of the mobile terminal 100. Namely, the controller 180 may detect that the mobile terminal 100 is in the face-down mode. To this end, the sensing device 140 may include a gyro sensor or an accelerometer sensor.

In certain circumstances, although the touchscreen 151 of the mobile terminal 100 is in a face up position, if a horizontal state is detected, it may be misunderstood to be the face-down mode. Hence, if an additional condition is met in accordance with a user setting or a manufacturer's intention, it is able to set to controller 180 to determine the face-down mode. As one example of the additional condition for the face-down mode determination, if the controller 180 additionally detects that both top and bottom ends of the mobile terminal 100 contact a specific surface as well as that the mobile terminal 100 is in the horizontal state, the controller 180 may determine that the mobile terminal 100 is in the face-down mode.

As another example of the additional condition for the face-down mode determination, if a brightness of a light, which is detected by the sensing device 140 in a manner of sensing a brightness of a light entering a space between the touchscreen 151 of the mobile terminal 100 and the surface on which the mobile terminal 100 is placed, belongs to a predetermined range, in addition to the condition that the mobile terminal 100 is in the horizontal state, the controller 180 may determine that the mobile terminal 100 is in the face-down mode.

If a plurality of additional conditions including the above examples are simultaneously met in accordance with a user's setting or a manufacturer's intention, the controller 180 may be set to detect the face-down mode of the mobile terminal 100. Various other conditions may be further added thereto as appropriate.

When the mobile terminal 100 is in the face-down mode, if the mobile terminal 100 undergoes a specific event, the controller 180 may control information on the specific event to be outputted through the touchscreen 151. If the touchscreen 151 has a concave curvature, a prescribed space exists between the touchscreen 151 and the surface. If the touchscreen 151 emits light in one of various wavelengths, brightness, colors and/or patterns depending on an event, the controller 180 may recognize information on the corresponding event by checking the wavelength, brightness, color and pattern of the light leaking from the prescribed space.

In the present specification, an event may refer to an interruption related to one of various functions of the mobile terminal 100. In particular, in one of a case in which a signal is received through the wireless communication device 110, a case in which an application scheduled to be activated in a prescribed time is activated, a case in which a content of a currently active application is changed, and a case in which an operation of a notification of a specific state of the mobile terminal 100 is activated, it may indicate that an event occurs in the mobile terminal 100.

For instance, a reception of a signal (e.g., a phone call, a message, data, etc.), an activation of an alarm operation or the like may correspond to an event of the mobile terminal 100. Moreover, in one of a case in which music is ended or changed in a currently active music player, a case in which a missed call notification window is displayed on the touchscreen 151 and the like, it may correspond to a case that an event occurs in the mobile terminal 100.

Particularly, a preset event may refer to an event previously set by a user to enable the touchscreen 151 to emit light in the face-down mode if a corresponding one of various events, which can occur in the mobile terminal 100, occurs. In the face-down mode of the mobile terminal 100, i.e., in the state in which the touchscreen 151 of the mobile terminal 100 is placed to face down towards a floor surface, the specific event may refer to an event a user intends to check through light emission of the touchscreen 151 among events occurring in the mobile terminal 100.

In the present specification, a touch gesture may refer to an input action for a user to manipulate the mobile terminal 100 through the touchscreen 151 or using the sensing device 140. The controller 180 may recognize a user's touch gesture, which is inputted through the touchscreen 151 or using the sensing device 140, as a command for manipulating the mobile terminal. Types of the touch gesture may include a user's tab action on a specific point, a flicking operation on a specific point, a touch drag action of drawing a specific trace and the like. As mentioned in the foregoing description, if the mobile terminal 100 includes the proximity sensor 141, the touch gesture may include a proximity touch. In particular, a touch gesture using the sensing device 140 may include a touch gesture configured to generate a sound around the mobile terminal 100 or a touch gesture performed to generate a sound from an outer surface of the mobile terminal 100.

Figure 5A:
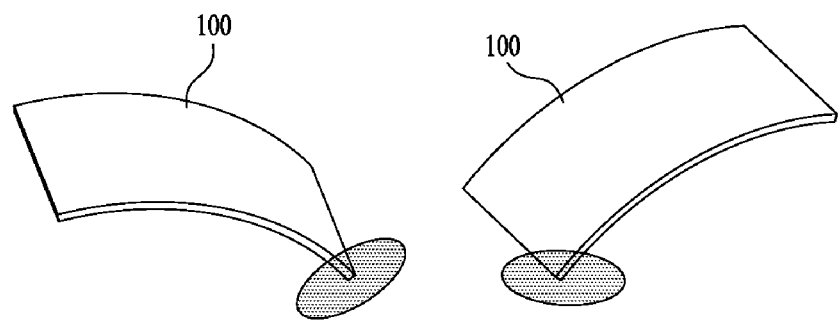
FIGS. 5A and 5B illustrate a face-down mode of a mobile terminal according to one embodiment as broadly described herein.
Figure 5B:
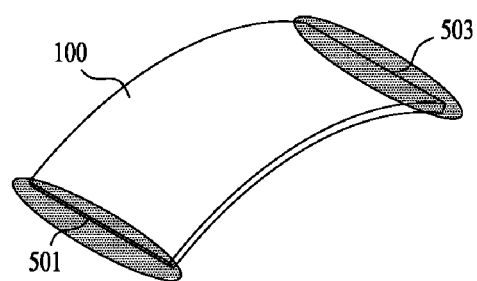

Referring to FIGS. 5A-5B, the mobile terminal may be inclined without being totally turned over as shown in FIG. 5A. In doing so, a random surface of the mobile terminal 100 currently contacts the surface but both ends of the mobile terminal 100 do not contact the surface. In this case, the controller 180 does not detect a state of the mobile terminal 100 as a face-down mode. On the other hand, the mobile terminal 100 may be completely turned over with the touchscreen 151 facing down toward the surface as shown in FIG. 5B. In a case in which a front side of the mobile terminal 100 is curved concavely, both top and bottom ends 501 and 503 of the mobile terminal 100 currently contact the floor. In this case, the sensing device 140 may sense a horizontal state of the mobile terminal 100 for a preset time. Hence, the controller 180 detects that the mobile terminal 100 is in the face-down mode. As mentioned in the forgoing description, if there is an additional sensing by the sensing device 140 in accordance with a user setting or a manufacturer's intention, it is able to set the controller 180 to detect that the mobile terminal 100 is in the face-down mode. In doing so, the sensing device 140 used for the detection of the face-down mode of the mobile terminal 100 will be referred to as a first sensing device hereinafter. A concept of the first sensing device is discriminated from that of a second sensing device for a user designated direction detection.

In order to sense a user designated direction, the second sensing device may include a sound sensor capable of sensing an ambient sound of the mobile terminal 100 and a sound generated by a touch gesture applied to an outer surface of the mobile terminal 100. And, the second sensing device may include a gyro sensor or an accelerometer sensor configured to sense a vibration generated from an ambience of the mobile terminal 100 or a vibration generated through a touch gesture applied to an outer surface of the mobile terminal 100. In a case in which a key for detecting a user designated direction is provided at an outer surface of the mobile terminal 100, the second sensing device may sense the user designated direction by sensing an input of the key.

Figure 6A:
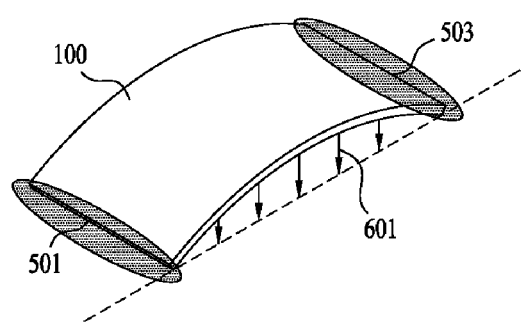
FIGS. 6A and 6B illustrate emission of light by a display in face-down mode of a mobile terminal according to one embodiment as broadly described herein.
Figure 6B:
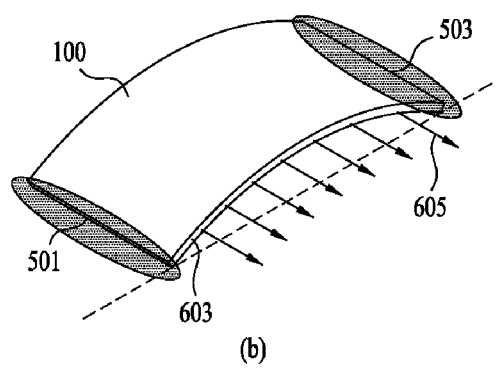

FIGS. 6A-6B illustrate a location/direction of a light emitted by a display in face-down mode of a mobile terminal according to one embodiment as broadly described herein.

Referring to FIG. 6A, the touchscreen 151 has a concave curvature. When both ends 501 and 503 of the mobile terminal 100 contact the receiving surface, the touchscreen 151 emits light 601 toward the receiving surface. Since the light 601 has a scattering property, the touchscreen 151 emits light toward a space between the touchscreen 151 and the surface and is also able to emit light to its environment. In doing so, the touchscreen 151 may emit light to a whole or partial area. If so, a user may recognize an event occurring in the mobile terminal 100 by checking the light emitted toward the external environment of the touchscreen 151.

In the arrangement shown in FIG. 6B, a light emitting device 603 configured to emit light 605 in response to an event is further provided at a lateral side of the mobile terminal 100 in order for a user to check the event occurring in the mobile terminal 100.

Referring to FIG. 6B, the light emitting device 603 may emit light 605 from at least one portion of at least one lateral side of the mobile terminal. Meanwhile, the light emitting device 603 may be provided as a touchscreen type to the mobile terminal 100 in accordance with a manufacturer's intention. Alternatively, the light emitting device 603 may include a device for light emission only. In a case in which a user is located next to a specific lateral side of the mobile terminal 100, the controller 180 may control the light emitting device 603 to emit light by obtaining a location of the user. For instance, in FIG. 6B, a direction of the light 605 emitted by the light emitting device 603 may include a direction in which the user's location recognized by the controller 180.

Figure 9A:
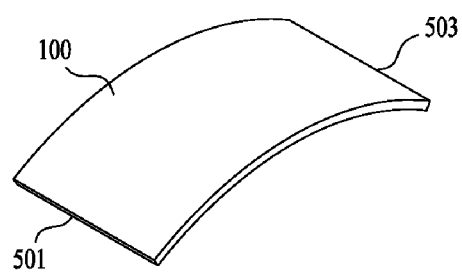
FIGS. 9A-9C illustrate detection by a mobile terminal of a user designated direction by recognizing a sound, according to one embodiment as broadly described herein.
Figure 9B:
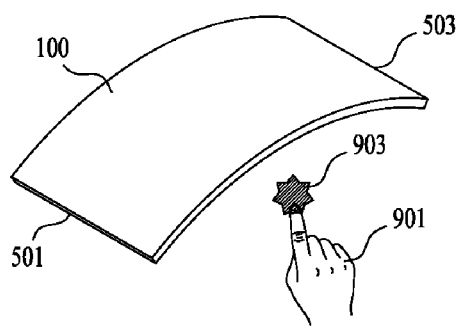
Figure 9C:
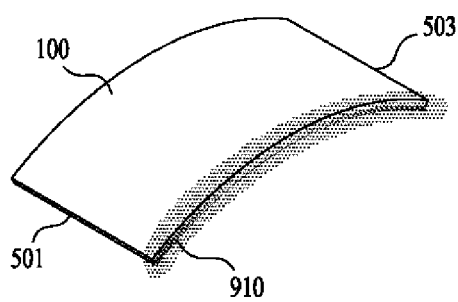

FIG. 7 is a flowchart of an operation of a mobile terminal according to one embodiment as broadly described herein, and FIGS. 9A-9C illustrate a process in which a mobile terminal detects a user designated direction by recognizing a sound, according to one embodiment as broadly described herein.

Referring to FIGS. 7 and 9A-9C, when the mobile terminal 100 is turned over, both ends 501 and 503 of the mobile terminal 100 contact the receiving surface as shown in FIG. 9A. As mentioned in the forgoing description with reference to FIGS. 5A-5B, the controller 180 may detect a face-down mode of the mobile terminal 100 through the first sensing device (S701). As shown in FIG. 9B, a user may set designated direction by generating a specific sound 903 in the environment of the mobile terminal 100 through a touch gesture 901, for example, at a right side of the mobile terminal 100 using the touch gesture 901. Generating the sound 903 through the touch gesture 901 is just exemplary, and a sound may be generated using a tool such as a pen and the like, a user's voice, an external sound device or the like. The second sensing device may recognize the sound and may also sense a direction associated with the recognized sound. In this case, the controller 180 sets the user designated direction to the sound detected direction sensed by the second sensing device (S703). For instance, in FIG. 9B, the second sensing device recognizes a sound generated from a right side of the mobile terminal 100 and then sets the user designated direction to the right direction of the mobile terminal. Moreover, in FIG. 9B, the touch gesture 901 may generate vibration. In particular, the sensing device 140 may sense the touch gesture 901 applied near the right side of the mobile terminal 100. Subsequently, the controller 180 may set the user designated direction to the right side of the mobile terminal 100 through the sensed vibration. In this case, the second sensing device may include a gyro sensor and/or an accelerometer sensor.

As shown in FIG. 9C, the mobile terminal 100 may output a notification to confirm the user designated direction mentioned in the above description. As shown in FIG. 9C, the touchscreen 151 emits light toward a right side of the mobile terminal 100 (S705). In the above example, since the user designated direction is set to the right side of the mobile terminal 100, the controller 180 controls the touchscreen 151 to emit light to correspond to the user designated direction. Thus, if the touchscreen 151 emits light, the user that the user designated direction is set to the right side.

In particular, since the touchscreen 151 emits light to scatter the light between the touchscreen 151 and the surface toward exterior, the scattered and propagating direction of the light may correspond to the user designated direction. In order to meet this condition, the controller 180 controls a specific region related to the user designated direction across the overall region of the touchscreen to emit light such that the touchscreen 151 may emit light in the user designated direction. And, the controller 180 may control the light so that it is not emitted in other directions, but only in the user designated direction.

FIG. 8 is a flowchart of an operation of a mobile terminal according to another embodiment as broadly described herein. Although the process for the controller 180 to set the user designated direction is described with reference to FIGS. 7 and 9A-9C, if there is no setting for the user designated direction, the controller 180 may control the touchscreen 151 to emit light in both right and left directions of the mobile terminal 100. The controller 180 detects a face-down mode of the mobile terminal 100 through the first sensing device (S701) and then controls the touchscreen 151 to emit light in response to a preset event (S801). In doing so, in order for light to be emitted in both of the right and left directions of the mobile terminal 100, the controller 180 controls an overall/entire region of the touchscreen 151 to emit light. Alternatively, the controller 180 may control the light to be emitted from regions close to the right and left sides of the mobile terminal 100.

An exemplary method for the controller 180 to set a user designated direction by detecting a sound through the second sensing device is described in detail with reference to FIGS. 10A-10B and 11A-11B as follows.

Figure 10A:
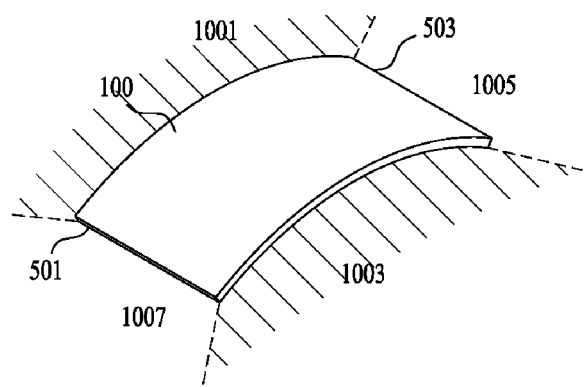
FIGS. 10A-10B and FIGS. 11A-11B illustrate a method in which a mobile terminal sets a user designated direction through a sound, according to one embodiment as broadly described herein.

Referring to FIG. 10A, in order for the second sensing device to sense a sound detected direction with respect to the mobile terminal 100 in the face-down mode, 4 regions surrounding the terminal body of the mobile terminal 100 are discriminately divided in a top direction 1005, a bottom direction 1007, a left direction 1001 and a right direction 1003, respectively. In this case, each of the regions indicates a region in which the second sensing device may sense a sound in the corresponding direction with respect to the mobile terminal 100. In order to sense a sound generated direction, the second sensing device may include a plurality of sensors installed on the inner regions adjacent to the sides, by which the mobile terminal 100 is enclosed, respectively. Hence, each of the sensors located in the inner regions adjacent to the corresponding sides may sense a sound from the corresponding region. If a sound is generated from a boundary between two regions, the sound may be sensed through at least one of the sensors respectively configured to sense the two regions. In some cases, if it is unnecessary to sense a sound in top and bottom areas 1005 and 1007 centering on the mobile terminal 100, the mobile terminal 100 may not include the sensors for sensing a sound in the top and bottom areas 1005 and 1007. In the following description, the area 1005 is assumed as corresponding to the top direction of the mobile terminal 100, the area 1007 is assumed as corresponding to the bottom direction of the mobile terminal 100, the area 1003 is assumed as corresponding to the right direction of the mobile terminal 100, and the area 1001 is assumed as corresponding to the left direction of the mobile terminal 100.

Figure 10B:
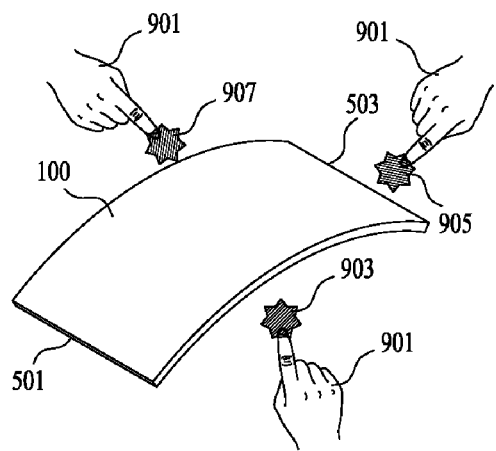

A case in which a sound is generated in a specific direction of the mobile terminal is described in detail with reference to FIG. 10B as follows. Referring to FIG. 10B, if a user generates a sound 903 by applying a touch gesture 901 in a specific area with respect to the mobile terminal 100, the second sensing device may sense the generated sound in the corresponding direction of the mobile terminal 100, and the controller 180 may set a user designated direction in response to the sound sensed by the second sensing device. If the sound 903 generated from the right region 1003 by the user's touch gesture 901 is detected, the controller 180 sets the user designated direction to the right direction. On the contrary, if the sound 907 generated from the left region 1001 by the user's touch gesture 901 is detected, the controller 180 sets the user designated direction to the left direction.

On the other hand, if the sound 905 generated from the top region 1005 by the user's touch gesture 901 is detected, the controller 180 sets the user designated direction to the top direction. Yet, if the mobile terminal 100 has a curvature in top-to-bottom direction, as shown in FIG. 10B, the controller 180 may control the user designated direction so that it is not set to the top/bottom direction in accordance with a user setting or a manufacturer's intention. As both of the top and bottom ends of the mobile terminal 100 come in contact with the receiving surface, if the user designated direction is set to one of the top direction or the bottom direction, although the touchscreen 151 emits light, it may be impossible for the light to be scattered in the corresponding direction. In this case, if a sound is detected through the second sensing device in one of the top direction or the bottom direction, the controller 180 may control the user designated direction to be set to the right or left direction corresponding to a direction closer to a sound detected location. If the mobile terminal 100 does not include a sensor for sensing the top/bottom region 1005/1007 of the mobile terminal 100, the controller 180 may operate in the same manner as mentioned in the above description.

For instance, referring to FIG. 10A, if a sound detected location sensed by the second sensing device in the top area 1005 of the mobile terminal 100 is closer to the right area 1003, the controller 180 may set the user designated direction to the right side. On the contrary, if the sound detected location is closer to the left area 1001, the controller 180 may set the user designated direction to the left side. Moreover, as mentioned in the foregoing description with reference to FIG. 9B, the above-described embodiment is applicable to the second sensing device including the gyro or accelerometer sensor configured to sense a vibration as well as to the second sensing device including the sound sensor configured to sense a sound.

If the sound 903 and the sound 907 are generated from the right and left areas of the mobile terminal 100 by the user's touch gestures, respectively, the controller 180 obtains sound sensed timing points sensed by the second sensing device, and may set the user designated directions in the detected order. For instance, if the sound 903 is detected, the user designated direction is set to the right side. If the sound 907 is then subsequently detected, the user designated direction is changed from the right side to the left side. In doing so, if the user designated direction is initially set to the right side, the controller 180 controls the touchscreen 151 to emit light to correspond to the right direction. Subsequently, if the user designated direction is changed into the left side, the controller 180 controls the touchscreen 151 to emit light to correspond to the changed direction.

After the user designated direction has been set to a specific direction in the above-described example, if a sound not intended by the user is generated from a direction opposite to the user designated direction, the user designated direction may be changed irrespective of a user's intention. To prevent this unintentional direction change, if a specific key input through the user input device 130 is detected, the controller 180 may enable a user designated direction lock function.

Alternatively, by detecting a preset user designated direction lock input, the controller 180 may control the user designated direction so that it is not changed. For instance, in a case in which the controller 180 controls the touchscreen 151 to emit light to correspond to the user designated direction, a user may confirm the user designated direction through the corresponding light emission. After the confirmation of the user designated direction, if the user generates a sound from the same user designated direction again, the second sensing device detects the corresponding sound generation and may then enable the user designated direction lock function.

If both of the sounds 903 and 907 are detected at the same time, the controller 180 may issue a notification indicating that the user designated direction setting has failed. This notification may be output in various ways. For instance, the touchscreen 151 may emit light in specific color, the mobile terminal 100 may vibrate, or an audio file of a specific warning sound or the like may be output.

Figure 11A:
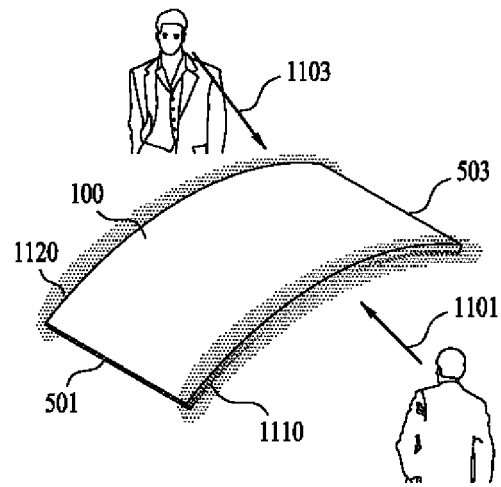

FIG. 11A illustrates a case in which a sound sensed by the second sensing device is a human voice. Although the sound is the human voice, a method for the controller 180 to set a user designated direction is the same as described with reference to FIGS. 10A-10B. In particular, if a user designated direction is set to a right side of the mobile terminal 100 by a voice command 1101, the controller 180 controls the touchscreen 151 to emit light in response to the voice command 1101. In doing so, if another voice command 1103 is detected through the second sensing device, the controller 180 may change the user designated direction to the left side. And, the above-mentioned user designated direction lock function may also be applicable to the present embodiment. In addition, the controller 180 may control a user designated direction to be set by a voice of a user of the mobile terminal 100 only. To this end, the user may input a user's voice through the microphone 122 of the input device 120 and may set this input as a sound for the user designated direction setting in advance.

For instance, after the user has set the user voice 1101 as a sound for the user designated direction setting in advance, if the second sensing device senses the user voice 1101, the controller 180 determines whether a voiceprint of a preset voice matches that of the voice detected through the second sensing device. As a result of the determination, if the controller 180 determines that the voiceprints of the two voices match each other in a prescribed range, the controller 180 sets the user designated direction to the right side. In doing so, although the voice 1103 of a person, who is not the user, is detected in a different direction through the second sensing device, since the latter voice 1103 is different from the former voice 1101 set in advance, the controller 180 controls the user designated direction so that it is not changed. When the user moves to the left side of the mobile terminal 100, if the second sensing device senses a user's voice, the controller 180 may control the user designated direction to be changed to the left side.

Figure 11B:
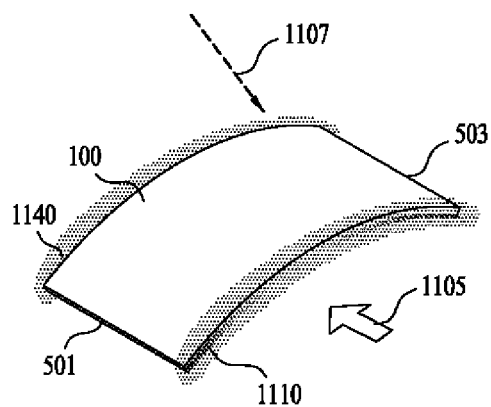

FIG. 11B illustrates a method of setting a user designated direction depending on a property of a sound sensed by the second sensing device. When sounds are generated from a plurality of directions around the mobile terminal, a user designated direction setting method is described with reference to FIG. 11B as follows.

Referring to FIG. 11B, if a decibel of a sound 1105 sensed in a right direction by the second sensing device of the mobile terminal 100 is relatively higher than that of a sound 1107 sensed in a left direction, the controller 180 may set a user designated direction to a right side. When a magnitude of a sound detected through the second sensing is greater than or equal to a prescribed decibel level, the controller 180 may recognize the detected sound as a sound for setting the user designated direction.

If a sound sensed by the second sensing device corresponds to a specific frequency band, the controller 180 may recognize the sensed sound as a sound for setting a user designated direction. For instance, if the second sensing device senses a sound 1105 belonging to a preset frequency band and also senses a sound 1107 deviating from the preset frequency band, the controller 180 may set a direction of the sound 1105 as the user designated direction.

Moreover, the second sensing device may detect a sense of distance of a sound. For instance, the second sensing device may sense a sound progressing away from the mobile terminal 100, a sound getting closer to the mobile terminal 100 and a sound generated from a fixed location. Using the detected sense of the distance of the sound, the controller 180 may use the sound getting closer or the sound generated from the fixed location as a sound for setting a user designated direction.

Figure 12A:
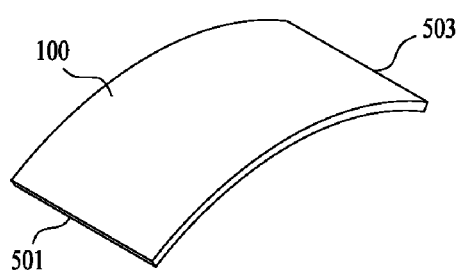
FIGS. 12A-12C illustrate an exemplary process for setting a user designated direction by recognizing a sound generated from an outer surface of a mobile terminal, according to one embodiment as broadly described herein.
Figure 12B:
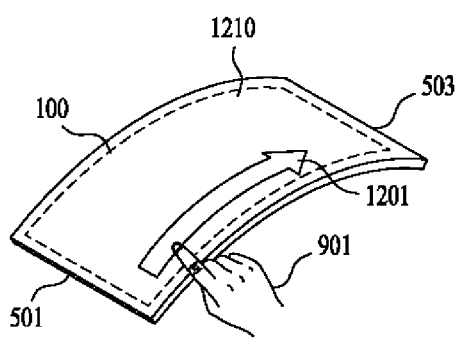
Figure 12C:
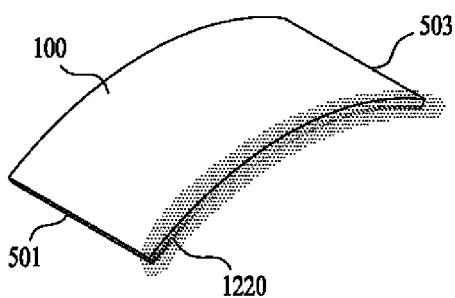

FIGS. 12A-12C illustrate a process for setting a user designated direction by recognizing a sound generated at an outer surface of a mobile terminal according to one embodiment as broadly described herein.

As mentioned in the foregoing descriptions with reference to FIGS. 7 and 9A-9C, the controller 180 may set a user designated direction. The description with reference to FIGS. 9A-9C may be applied to the cases shown in FIGS. 12A and 12C. Yet, unlike the former user designated direction shown in FIGS. 9A-9C, the user designated direction shown in FIGS. 12A-12C is set based not on a sound generated from an external environment of the mobile terminal 100 but on an input/sound generated at an outer surface of the mobile terminal 100.

As shown in FIG. 12B, a user designated direction may be set when a touch gesture 901 inputted by a user is applied to a specific region 1201 of an outer surface of the mobile terminal 100. In this case, the touch gesture may be performed on the outer surface of the mobile terminal 100. Particularly, a case of performing the touch gesture on a rear side of the mobile terminal 100 is taken as an example for the following description.

According to the present embodiment, the second sensing device may include a sensor capable of sensing a sound generated at an outer surface of the mobile terminal 100. Particularly, FIG. 12B shows one example in which the second sensing device is configured to be widely located on a rear side of the mobile terminal 100 in order to sense a sound generated at a region of the rear side of the mobile terminal 100. The second sensing device is arranged on the rear side of the mobile terminal 100 for example, by which embodiments may be non-limited. And, the second sensing device can be arranged on a lateral side of the mobile terminal 100. Such a sensor 1210 may include a touch sensor depending on a material of the outer surface of the mobile terminal 100. In a case in which the mobile terminal 100 includes a proximity sensor, the sensor 1210 may include the proximity sensor. And, every sensor capable of sensing a sound generated form the outer surface of the mobile terminal 100 may be applied as the sensor 1210 of the second sensing device irrespective of a type or name of the corresponding sensor.

Referring to FIG. 12B, the controller 180 may detect a face-down mode of the mobile terminal 100 through the first sensing device (S701). The controller 180 detects a sound generated from a rear side of the mobile terminal 100 and is then able to set a user designated direction (S703). As a touch gesture 901 is performed, if a region 1201 in which the sound is generated is a right side of the mobile terminal 100, the controller 180 may set the user designated direction to the right side.

In the description of the embodiments shown in FIGS. 12A-12C, explained for example is the case in which the second sensing device senses the sound generated at the outer surface of the mobile terminal 100. Yet, since the second sensing device mentioned in the above description may include a gyro sensor or an accelerometer sensor, the second sensing device may sense a shock or impact applied to the outer surface of the mobile terminal 100 or a vibration of the mobile terminal 100 as well. Therefore, the above-described embodiment may be applied to a case of sensing a shock or vibration through the outer surface as well as to the case of generating the sound at the outer surface of the mobile terminal 100.

In the following description, a method for a user to set a user designated direction by generating a sound from an outer surface of the mobile terminal 100 is explained in detail with reference to FIG. 13A.

Figure 13A:
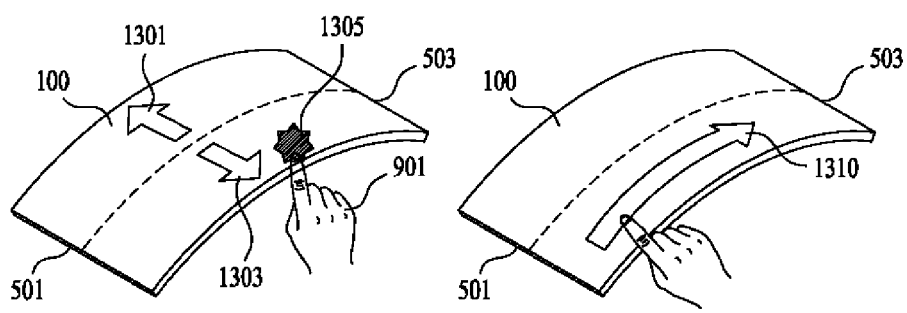
FIG. 13A illustrates a process for setting a user designated direction by recognizing a sound generated by a user from an outer surface of a mobile terminal, according to one embodiment as broadly described herein.

FIG. 13A (a) shows a rear side of the mobile terminal 100. In particular, the rear side is partitioned into a right region 1303 and a left region 1301. A case in which the mobile terminal 100 is in face-down mode is taken as an example. If a user inputs a touch gesture 901 to the rear side of the mobile terminal 100, the second sensing device senses a sound generation from a touch region 1305. The controller 130 determines whether the touch region 1305 belongs to the right region 1303 of the mobile terminal 100 or the left region 1301 of the mobile terminal 100. As a result of the determination, if the touch region 1305 belongs to the right region 1303 of the mobile terminal 100, the controller 180 sets a user designated direction to a right side. The controller 180, as shown in FIG. 12C, may control the touchscreen 151 to emit light in a direction corresponding to the user designated direction. In particular, if the touch region 1305 belongs to the right region 1303 of the mobile terminal 100, the touchscreen 151 emits light in the right direction 1220.

FIG. 13A (b) illustrates a method of setting a user designated direction depending on a sound generated if a drag input with a touch gesture is applied to the rear side of the mobile terminal 100. If a drag region 1310 from which a sound is generated by the drag input is the right region of the mobile terminal 100, the controller 180 can set a user designated direction to a right side. In particular, when the touch gesture is a drag input, if the second sensing device detects that a sound continues by a dragged distance 1310, the controller 180 can control the touchscreen 151 to emit light to correspond to the region.

According to the descriptions with reference to FIGS. 12A-C and 13A, a user performs a touch gesture on a rear side of the mobile terminal 100, and a sound generated by the touch gesture is then sensed by the second sensing device. Yet, aside from the case that the second sensing device senses the sound, if a vibration is generated by the touch gesture and the second sensing device senses the generated vibration, the controller 180 can set a user designated direction depending on a vibration generated region of an outer surface of the mobile terminal 100 as well. For instance, if a user rubs the rear side of the mobile terminal 100 with a touch gesture as shown in FIG. 12B or a user taps the mobile terminal 100 on the rear side as shown in FIG. 13A(a), the second sensing device senses a vibration and the controller 180 is then able to set a user designated direction in consideration of a vibration detected region. In doing so, a sensor of the second sensing device for sensing the vibration may include at least one of a gyro sensor or an accelerometer sensor.

Figure 13B:
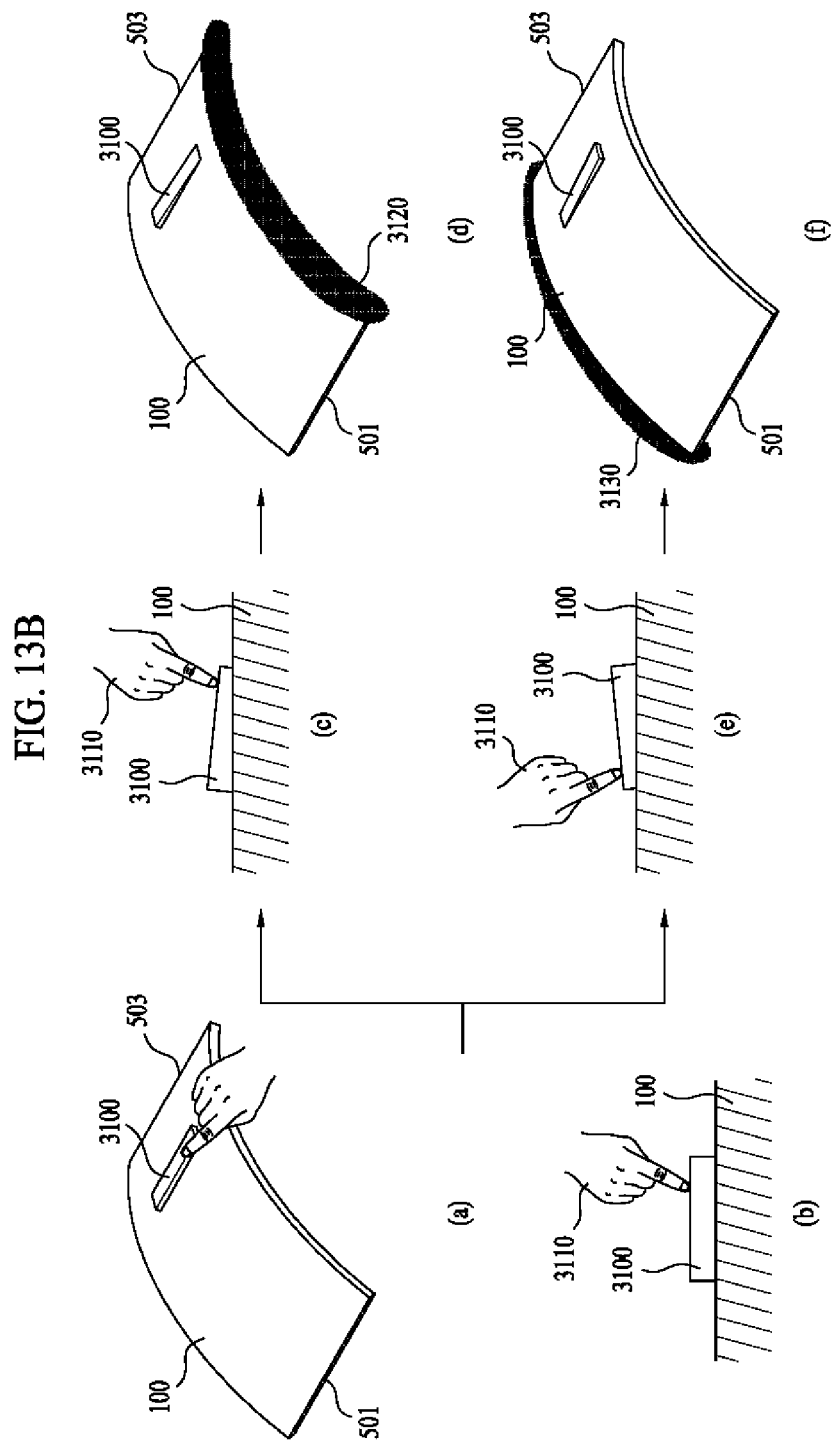
FIG. 13B illustrates a process for setting a user designated direction using a physical key provided at an outer surface of a mobile terminal, according to one embodiment as broadly described herein.

FIG. 13B and in particular FIGS. 13B(a) through 13B(f), illustrate a process for setting a user designated direction using a physical key provided at an outer surface of a mobile terminal according to one embodiment as broadly described herein.

Referring to FIG. 13B (a), a physical key 3100 may be provided at a rear side of the mobile terminal 100. FIG. 13B (b) shows the physical key 3100 on the rear side of the mobile terminal 100 viewed from the front direction 501, in which a user presses 3110 the physical key 3100. Referring to FIG. 13B (c), if the user presses 3110 the physical key 3100 at a right end/in a right direction, the physical key 3100 is inclined to the right side in a seesaw motion, and the controller 180 may set a user designated direction to a right direction of the mobile terminal 100 as shown in FIG. 13B(d). Moreover, referring to FIG. 13B (e), if the user presses 3110 the physical key 3100 in a left direction, the physical key 3100 is inclined to the left side in a seesaw motion, and the controller 180 may set a user designated direction to a left direction of the mobile terminal 100 as shown in FIG. 13B(f).

Figure 14A:
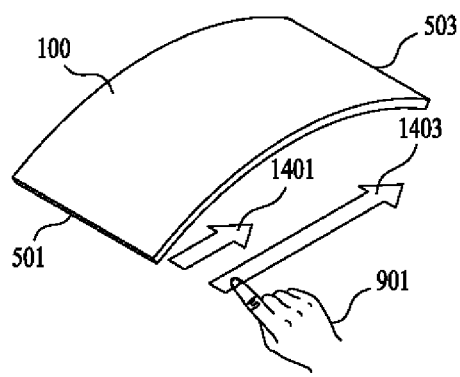
FIGS. 14A-14C illustrate various light-emitting types of a display based on a movement of a sound detected by a mobile terminal or a drag region detected by the mobile terminal, according to one embodiment as broadly described herein.
Figure 14B:
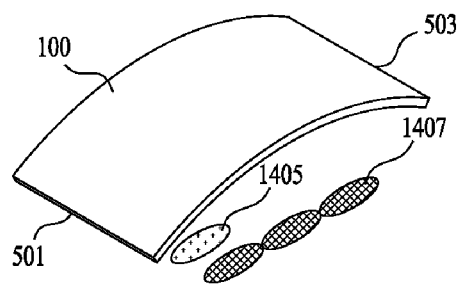
Figure 14C:
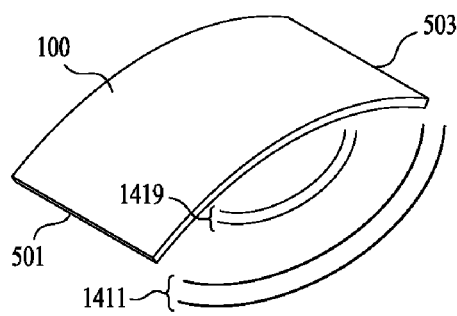

FIGS. 14A-14C illustrate various light-emitting types of a display depending on a movement of a sound detected by a mobile terminal or a drag region detected by the mobile terminal, according to one embodiment, with the mobile terminal 100 in face-down mode and a user designated direction set to a right side.

A case in which a length of a sound detected by the second sensing device is different is described in detail with reference to FIGS. 14A and 14B.

Referring to FIG. 14A. a user generate a sound from a right side of the mobile terminal 100 using a touch gesture 901. In doing so, if the touch gesture 901 includes a drag input, the generated sound may move from a drag start position to a drag end position. The second sensing device may detect a length of the moving sound. The controller 180 may then determine lengths of drags 1401 and 1403 through the detection of the moving sound length. In this case, the action for the user to generate the sound length with the touch gesture 901 becomes an action of setting a display region of the touchscreen 151. Moreover, as mentioned in the foregoing description with reference to FIG. 9B, the above-described embodiment is applicable to a case in which the second sensing device includes the gyro or accelerometer sensor for sensing a vibration as well as to the case in which the second sensing device includes the sound sensor for sensing a sound.

FIG. 14B illustrates an example in which a light emitting region of the touchscreen 151 is changed depending on the display region setting mentioned in the above description with reference to FIG. 14A.

Referring to FIG. 14B, for example, the second sensing device may sense a movement of a sound generated from a drag 1401 and a movement of a sound generated from a drag 1403. And, the controller 180 may determine a length of the drag 1401 and a length of the drag 1403. Hence, the controller 180 may control the touchscreen 151 to emit light in response to the corresponding drag length. In particular, if the second sensing device senses the sound from the drag 1401, the controller 180 determines the length of the drag 1401 and is then able to control the touchscreen 151 to emit light 1405 to correspond to the determined length of the drag 1401. In particular, if the second sensing device senses the sound from the drag 1403, the controller 180 determines the length of the drag 1403 and is then able to control the touchscreen 151 to emit light 1407 to correspond to the determined length of the drag 1403. In doing so, the controller 180 may control the touch screen 151 to emit light from a part, which corresponds to the drag length, of a region corresponding to the user designated direction.

FIG. 14C illustrates an example in which a light emission type of the touchscreen 151 is changed in response to a length of a sound generated near the mobile terminal 100 through a user's touch gesture 901 or a drag input applied to an outer surface of the mobile terminal 100 by a user.

Referring to FIG. 14C, if the second sensing device senses a length of the sound generated from the drag 1401, the controller 180 may control the touch screen 151 to emit light 1409 in brightness, wavelength or color corresponding to the sensed sound length. If the second sensing device senses a length of a sound generated from the drag 1403 relatively longer than the former drag 1401, the controller 180 may control the touchscreen 151 to emit light 1411 in brightness/wavelength/color that is greater/longer/thicker than that of the light emission 1409 of the touchscreen 151 attributed to the former drag 1401 in response to the detected length of the sound generated from the later drag 1403.

According to the above description with reference to FIGS. 14A-14C, the touchscreen 151 emits light by changing a region in response to a length of a sound generated by the touch gesture 901. And, the same description as mentioned with reference to FIGS. 14A-14C may be applied to a case of generating a sound by applying a touch gesture on an outer surface of the mobile terminal 100. In particular, if a drag input with a touch gesture is applied to the outer surface of the mobile terminal 100, the second sensing device can sense a length of the generated sound by the drag input and the controller 180 may control the touchscreen to emit light in response to the sound generated length.

As mentioned in the foregoing description with reference to FIG. 9C and FIG. 12C, if a user designated direction is set, the controller 180 controls the touchscreen 151 to emit light so that a user may confirm the set user designated direction. In doing so, referring to FIG. 7, while the face-down mode of the mobile terminal 100 is maintained, if a preset event occurs in the mobile terminal 100, the controller 180 may control the touchscreen 151 to emit light to correspond to the user designated direction (S705).

FIGS. 15A-15D show examples of a screen displayed on the touchscreen 151 facing downward when the controller 180 detects a preset event in the face-down mode. In particular, if the face-down mode is not entered, the controller 180 may control an event occurring in the mobile terminal 100 to be displayed on the touchscreen 151. Yet, if the face-down mode is entered, while the touchscreen 151 of the mobile terminal 100 facing downward toward the floor, although the controller 180 detects the preset event, it is not necessary for the controller 180 to control the touchscreen 151 to output information on the event. Therefore, in the face-down mode, the controller 180 may control the touchscreen 151 to output minimal information on the event in a partial region only, to provide a user with limited information, i.e., an indication that the present event has occurred.

Figure 15A:
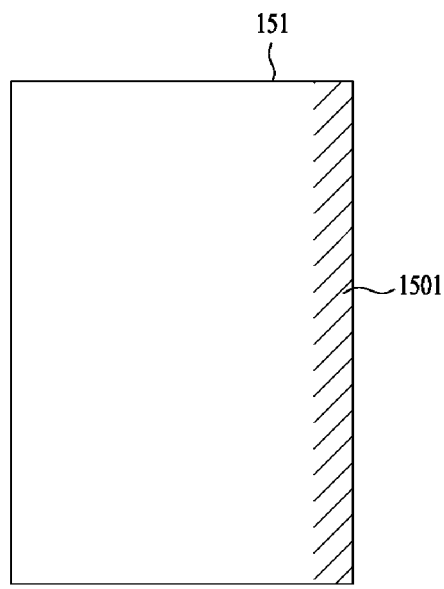
FIGS. 15A-15D illustrate a light-emitting type of a display in face-down mode of a mobile terminal, according to one embodiment as broadly described herein.
Figure 15B:
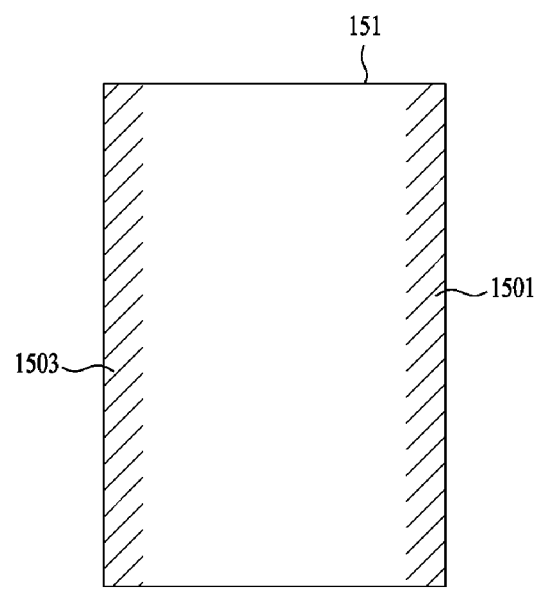

Particularly, like FIG. 9C or 12C, FIG. 15A illustrates an example of a region 1501 from which the touchscreen 151 emits light if a user designated direction is set to a prescribed direction. FIG. 15B illustrates an example of regions 1501 and 1503 from which the touchscreen 151 emits light if a user designated direction is not set. The controller 180 may adjust a brightness or pattern of the light emitted through the touchscreen 151 depending on the type or number of detected preset event(s). Hence, a size of each of the regions 1501 and 1503 from which the touchscreen 151 emits light may be enlarged or reduced.

Figure 15C:
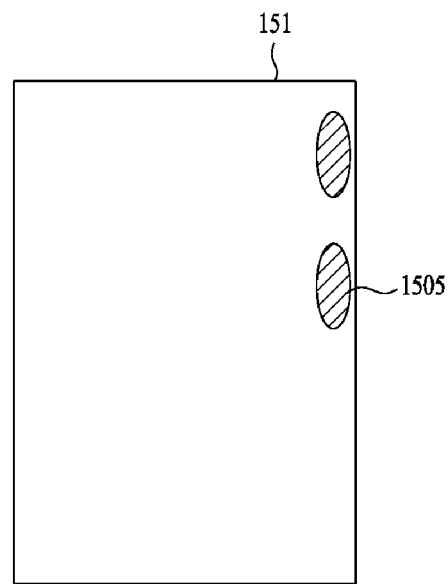

FIG. 15C illustrates a case in which a size of a light emitting region of the touchscreen 151 is controlled in response to the number of preset events detected by the controller 180. If a first preset event is detected, the controller 180 may control a partial region of the touchscreen 151 to emit light. In doing so, if a second preset event is detected, the controller 180 adjusts the light emitting region of the touchscreen 151 attributed to the first preset event and may control the number information to be displayed in response to an increment of the event occurrence number. In particular, if the second preset event is detected, the controller 180 may control a light emitting region 1505 to be additionally displayed in accordance with the detected event. Moreover, the controller 180 may control a light emitting region of the touchscreen 151 to emit light in response to the event occurrence number increment.

Figure 15D:
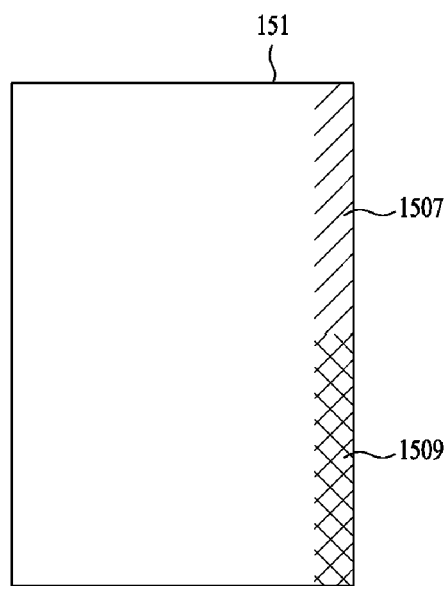

FIG. 15D illustrates a case in which a light emitting region of the touchscreen 151 emits light partitioned into different color region(s).

Referring to FIG. 15A-15D, if a first preset event occurs, the controller 180 controls the touchscreen 151 to emit light from a region 1507 in a first color. If a second preset event occurs, the controller 180 controls the touchscreen 151 to emit light from a region 1509 in a second color. The controller 180 may control the touchscreen 151 to emit light from both of the regions 1507 and 1509 at the same time. Alternatively, the controller 180 may control the touchscreen 151 to emit light alternately from the regions 1507 and 1509 in a preset time interval in-between. The regions 1507 and 1509 may be further subdivided depending on the types or number of events and their sizes may be changed as well.

Figure 16A:
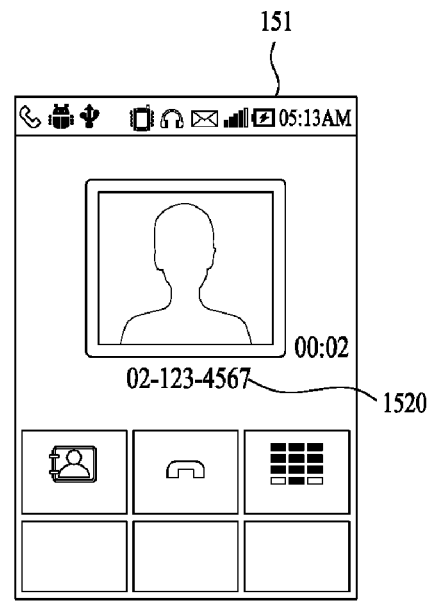
FIGS. 16A-16B illustrate a process for a display of a mobile terminal to emit light in a user designated direction in response to a preset event, according to one embodiment as broadly described herein.
Figure 16B:
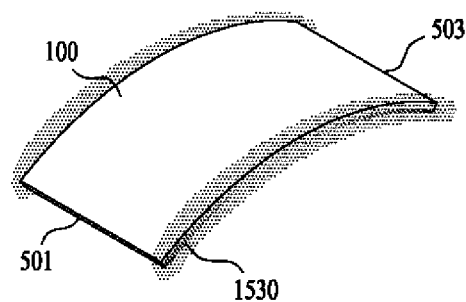

FIGS. 16A-16B illustrate a display of a mobile terminal emitting light in a user designated direction in response to a preset event according to one embodiment as broadly described herein.

FIG. 16A shows one example of a screen on which received information and a window for selecting whether to receive are displayed on the touchscreen 151 if a preset event is a call reception of the mobile terminal 100. When a call reception 1520 from a specific contact is a preset event, if a call reception event occurs, the controller 180 checks whether the occurring event is the preset event. If the occurring event corresponds to the preset event 1520, as shown in FIG. 16B, the controller 180 controls the touchscreen 151 to emit light 1530. FIG. 16B shows a case in which the touchscreen 151 emits light if the user designated direction is not set as shown in FIG. 15B. When the user designated direction is set to the right side of the mobile terminal 100, if the preset event occurs, the controller 180 may control the touchscreen 151, as shown in FIG. 15A, to emit light in the right direction set as the user designated direction. Thus, a user may be aware that the preset event has occurred.

Figure 17A:
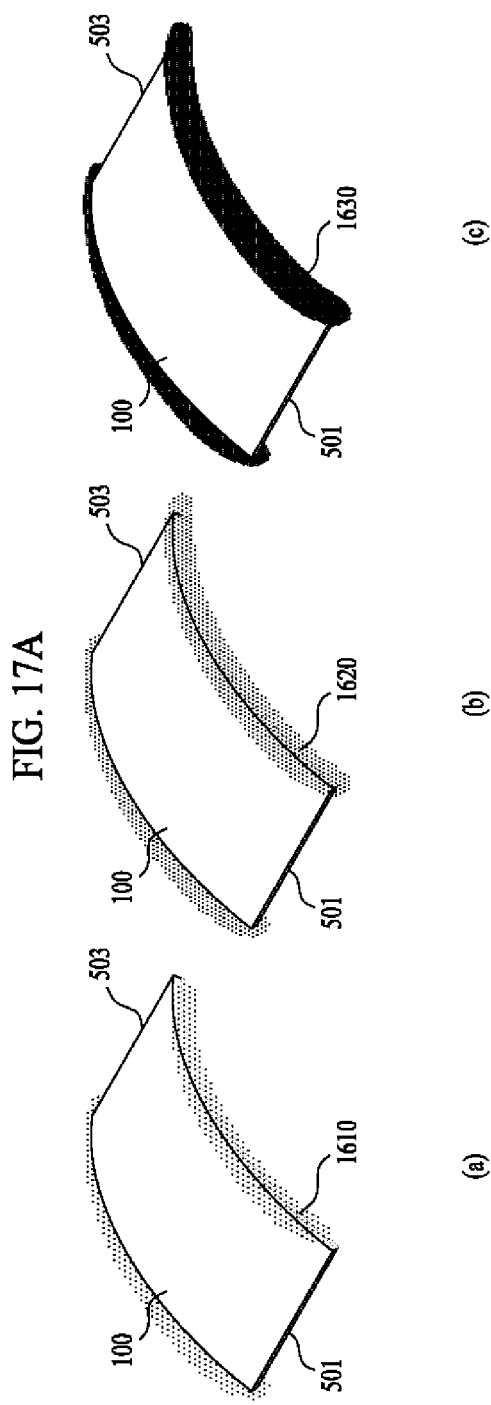
FIG. 17A illustrates a process for a display of a mobile terminal to emit light differently depending on significance of an event, according to one embodiment as broadly described herein.

FIG. 17A illustrates a display of a mobile terminal emitting light differently depending on significance of an event, according to one embodiment as broadly described herein. Particularly, FIGS. 17A-17C illustrate a case in which there is no setting for a user designated direction, as mentioned in the foregoing description with reference to FIG. 8.

Figure 17B:
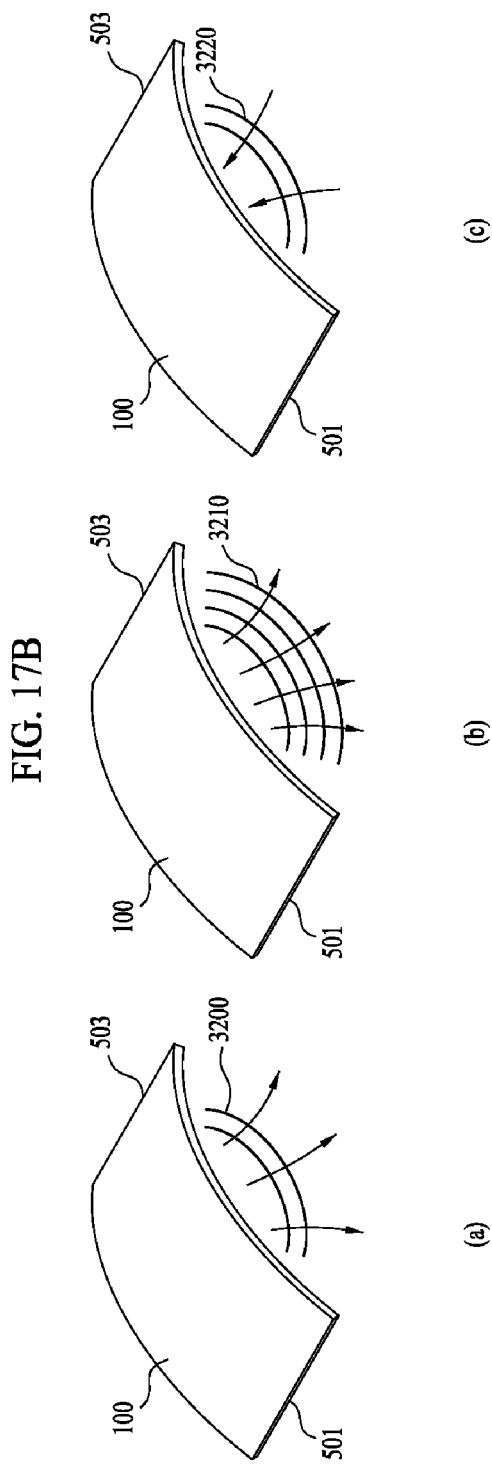
FIG. 17B illustrates a display pattern of a display in a case of a call reception by a mobile terminal, according to one embodiment as broadly described herein.

Referring to FIGS. 17A-17C, the controller 180 may control the touchscreen 151 to emit light by changing its brightness depending on a preset event. For instance, a case in which the preset event includes a message reception from a specific sender is taken as an example for the following description. In certain circumstances, the user may intend to check only messages from a specific sender, without checking other messages. Hence, the user may be able to set a message reception from a specific sender as a preset event. In doing so, if a message is received once, the controller 180 determines whether the message reception corresponds to the preset event. As a result of the determination, if the message reception corresponds to the preset event, the controller 180 may control the touchscreen 151 to emit light at a relatively weak brightness, as shown in FIG. 17A(a).

After the user has not checked the received message, if a second message is received from the same sender, the controller 180 may control the touchscreen 151 to emit light at a greater/thicker brightness level, as shown in FIG. 17A(b). After the user has not checked the first or second message and a third message is received from the same sender, the controller 180 may control the touchscreen 151 to emit light in an even greater/thicker brightness, as shown in FIG. 17A(c). The brightness of the light emitted by the touchscreen in response to a received message unchecked count may be adjusted in accordance with a user setting or a manufacturer's intention. Moreover, if the received message unchecked count is incremented by 1, the controller 180 may control the brightness to be changed in response to a count according to the user setting instead of being changed in response to an increment of the received message unchecked count by 1 like the above example. In addition, although the event occurrence count is repeated, if the user does not check the event, the mobile terminal 100 may provide a visual effect as if a surface contacting the touchscreen 151 is tinged with the color of the light emitted by the touchscreen 100. In particular, the controller 180 detects a color of the surface on which the mobile terminal 100 is received and may control the touchscreen 151 to emit light in a color complementary to a color of the surface. If the user does not check the event having occurred plural times, the controller 180 may control the touchscreen 151 to emit light in a manner of increasing or thickening the color of the light emitted by the touchscreen 151 gradually, thereby causing a visual effect as if the surface is tinged with the light emitted by the touchscreen 151. A method for the controller 180 to obtain a color of the receiving surface shall be described in detail with reference to FIG. 28A later.

Meanwhile, if a user sets a preset event to a signal reception from a specific sender as well as to a message reception, the corresponding signal may include all signals (e.g., phone, message, messenger, etc.) received from the same sender. For instance, if a message is received once from a specific sender corresponding to a preset event, referring to FIG. 17A (a), the controller 180 may control the touchscreen 151 to emit light. Subsequently, if a user receives a phone call once from the same sender while the received message remains unchecked, referring to FIG. 17A (b), the controller 180 may control the touchscreen 151 to emit light at a greater/thicker brightness than that shown in FIG. 17A (a).

A case in which a user sets a signal reception not from a specific sender but from a specific contact list as a preset event is taken as an example for the following description. First of all, if contacts of three persons A, B and C exist in a contact list, each time a signal is received from each of the contacts, the controller 180 may control the touchscreen 151 to emit light at a brightness level shown in one of FIGS. 17A (a) to 17A (c). In particular, the controller 180 may control the touchscreen 151 to emit light in a manner of individually changing the brightness of the touchscreen for each of the persons existing in the contact list.

The controller 180 may control the touchscreen 151 to emit light in a manner of changing the brightness of the light for each count of signal reception(s) from a contact existing in the contact list. For instance, if a message is received once from the contact A existing in the contact list, the controller 180 may control the touchscreen 151 to emit light as shown in FIG. 17A (a). If a second message is received from the contact A, the controller 180 may control the touchscreen 151 to emit light as shown in FIG. 17A (b). If a message is then received from the contact B existing in the same contact list, the controller 180 may control the touchscreen 151 to emit light as shown in FIG. 17A (c). Thus, the controller 180 may control the touchscreen 151 to emit light by changing the brightness of the touchscreen 151 for each count of the signal reception from a contact belonging to a specific contact list.

In the above description, explained only is the case in which the touchscreen 151 emits light by changing brightness of the light in response to an event. Yet, the touchscreen 151 may emit light by changing at least one of a color, a pattern and a wavelength in response to an event.

For instance, if a phone call is received from each of contacts A, B and C included in a contact list of the mobile terminal 100, the controller 180 may control the touchscreen 151 to emit light in different colors, 1610, 1620 and 1630, as in FIG. 17A (a), FIGS. 17A (b), and 17A (c). A user may set a color, which is output through the touchscreen 151 for a phone call reception, for each contact existing in a contact list in advance. When a phone call is received, the controller 180 checks a contact and is then able to control the touchscreen 151 to emit light in the user-preset color corresponding to the checked contact. Hence, when a phone call is received, the user may identify the contact by checking the color of the light emitted by the touchscreen 151.

As noted above, a user designated direction is not set in the mobile terminal 100 shown in FIG. 17A. Yet, if there is a user designated direction setting, the controller 180 may control the touchscreen 151 to emit light in the user designated direction only.

FIG. 17B illustrates an example in which a display pattern is emitted in response to a call reception by a mobile terminal according to one embodiment as broadly described herein.

Referring to FIG. 17B, if a preset event includes a phone call reception by the mobile terminal, the controller 180 may represent an incoming call feeling through the touchscreen 151. In particular, referring to FIGS. 17B (a) to 17B (c), if the controller 180 detects a phone call reception, the controller 180 may control a pattern of light to be displayed by the touchscreen 151 so that a wavelength of the light gradually spreads and then decreases again. In particular, if a phone call is received, the controller 180 may control the light to be emitted by the touchscreen 151 in a manner of spreading in an external direction 3200 of the mobile terminal, as shown in FIG. 17B (a), further spreading in the external direction 3210, as shown in FIG. 17B (b) and then decreasing in a direction 3220 toward the mobile terminal 100, as shown in FIG. 17B (c). And, the controller 180 may control this pattern to be repeated.

Figure 18A:
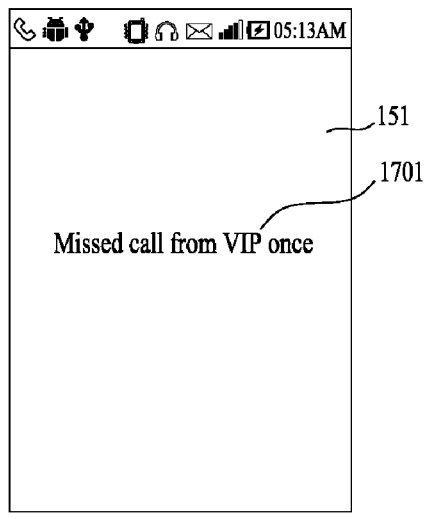
FIGS. 18A-18C illustrate a process for a display of a mobile terminal to emit light differently in response to the count of events in an event of a signal reception, according to one embodiment as broadly described herein.
Figure 18B:
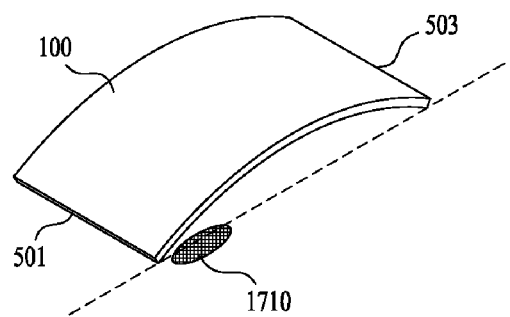
Figure 18C:
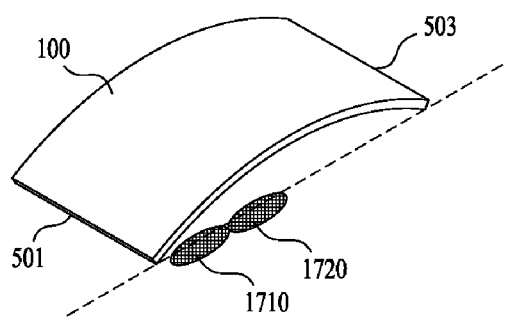

FIGS. 18A-18C illustrate a process for a display of a mobile terminal to emit light differently in response to the count of event occurrences, according to one embodiment as broadly described herein.

Referring to FIG. 18A, a notification window for indicating an occurrence of a missed call from a VIP is displayed as one example of a preset event. In the following description, a case in which a user designated direction is a right side is taken as an example. If the user misses a call, the controller 180 controls a notification window for indicating a missed call to be displayed on the touchscreen 151. Yet, when the mobile terminal 100 is in face-down mode, since the user does not directly watch the touchscreen 151, it may be difficult for the user to check the notification window. The controller 180 determines whether the occurrence of the missed call corresponds to a preset event.

For instance, a user composes a VIP list in advance. If a signal is received from a contact belonging to the VIP list, the user may set the signal reception as an event occurrence. If the user is unable to answer an incoming call from a VIP, a missed call occurs, and the controller 180 may control the touchscreen 151 to emit light. Referring to FIGS. 18B and 18C, if the missed call from the VIP, which corresponds to the preset event, occurs once, the controller 180 may control the touchscreen 151 to emit light as shown in FIG. 18B. The controller 180 controls the touchscreen 151 to emit light from a prescribed region of the touchscreen 151 in a right user designated direction in a manner that a partial region of the touchscreen 151 emits light to correspond to an event occurrence count. Hence, if the touchscreen 151 emits light from a light emitting region corresponding to an event count '1', the light may be emitted to an area 1710 (hereinafter named a first area) of a surface on which the mobile terminal 100 is received. If the same event occurs again, the controller 180 may control the touchscreen 151 to emit light by extending a light emitting region of the touchscreen 151 in proportion to the occurrence count of the same event. For instance, if a missed call from a VIP occurs twice, the controller 180 may control the touchscreen 151 to emit light as shown in FIG. 18C. Referring to FIG. 18C, the light from the touchscreen 151 is emitted to an area 1720, twice as large as the first region 1710 corresponding to the missed call occurrence count '1' shown in FIG. 18B.

According to the description of the above example, the preset event includes the occurrence of the missed call from the VIP. Yet, when a missed call is not from a caller on the VIP list and a missed call from a VIP does not occur, the controller 180 may handle the non-VIP contact as equal to the VIP contact. When the controller 180 checks a user's transceiving pattern of the non-VIP contact, if a missed call occurs consecutively over a predetermined count, the controller 180 may handle the non-VIP contact as a VIP contact. Alternatively, as a result of analysis of the user's transceiving pattern, a missed call from the corresponding contact may have occurred previously. If the controller 180 detects a case in which a time taken for a user to make a phone call to the corresponding contact is very short (i.e., smaller than a prescribed time) or a case in which a count of outgoing calls to the corresponding contact from the user exceeds a preset count, the controller 180 may apply the above-described embodiment by handling the corresponding contact as a VIP contact despite that the corresponding contact has not been designated a VIP contact. Thus, when a missed call from a VIP contact or a contact handled as a VIP contact occurs, if a user picks up the mobile terminal 100 and then puts it to user's ear, the controller 180 may control the mobile terminal 100 to make a phone call to the corresponding contact. To this end, if a predetermined condition is met using at least one of a gyro sensor, an accelerometer sensor, an altitude sensor, a proximity sensor and the like, the controller 180 may control the wireless communication may 110 to connect a call to the corresponding contact.

Embodiments may be applied to various cases of changing a light emitting region depending on a count as well as on a missed call occurring event.

FIGS. 19A-19D illustrate a process in which a display of a mobile terminal emits light differently depending on an event type or an event occurrence count, with a user designated direction set to the right, according to one embodiment. Particularly, if a plurality of events occur in the mobile terminal 100 in face-down mode, a process for the touchscreen 151 to emit light by changing a color, wavelength, pattern and/or light emitting region is described in detail with reference to FIGS. 19A-19D as follows.

Figure 19A:
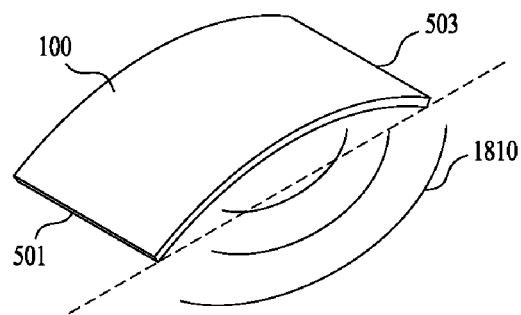
FIGS. 19A-19D illustrate a process for a display of a mobile terminal to emit light differently depending on an event type or an event occurrence count in a case of a user designated direction set to the right, according to one embodiment as broadly described herein.
Figure 19B:
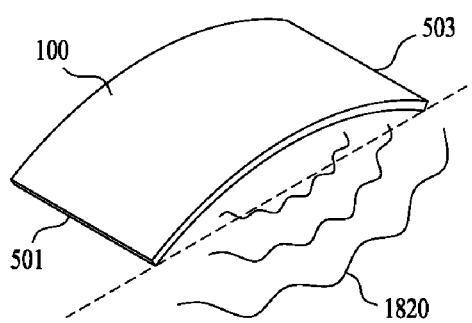

Referring to FIGS. 19A and 19B, if the controller 180 detects a first preset event and a second preset event at separate times, the controller 180 may control the touchscreen 151 to emit light in a different wavelength depending on a type of the detected event. After the controller 180 has detected the first preset event, while the touchscreen 151 is emitting light in a first form as shown in FIG. 19A, if the controller 180 detects the first preset event, the controller 180 may control the touchscreen 151 to emit light in a second form modified from the first form, as shown in FIG. 19B. Alternatively, the controller 180 may control the touchscreen 151 to emit light in a pattern of alternatively repeating the first form and the second form.

The embodiment for light emission by modification into the second form from the first form or in the pattern of repetition between the first form and the second form may be applied to a case in which the first preset event and the second preset event are identical to each other in accordance with a user setting or a manufacturer's intention. In particular, the modification of the light emitting form or the repetition of the light emitting pattern may provide a user with information on an occurrence count of the same event.

On the other hand, the above-described embodiment may be applied to a case in which the first preset event and the second preset event are different from each other in accordance with a user setting or a manufacturer's intention. In particular, the modification of the light emitting form or the repetition of the light emitting pattern may provide a user with information indicating that different events have occurred.

Figure 19C:
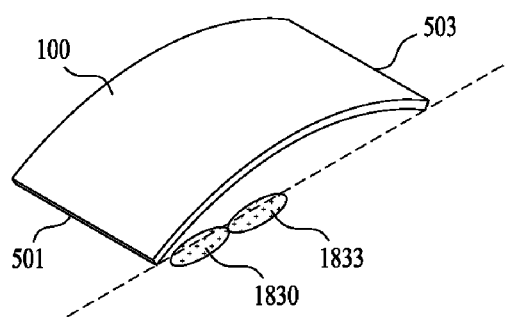

Referring to FIG. 19C, as mentioned in the foregoing description with reference to FIGS. 18A-18C, the controller 180 may control the touchscreen 151 to emit light to correspond to the number of occurrences of preset events. The controller 180 detects a first preset event and is then able to control a light emitting region of the touchscreen 151 to be displayed on a first area 1830 of a surface on which the mobile terminal 100 is received. While the touchscreen 151 emits light to the first area 1830, if the controller 180 detects a second preset event, the controller 180 may control the touchscreen 151 to emit light to a second area 1833. In this case, although the first preset event and the second preset event differ from each other in type, something in common may exist in the contents of the events. For instance, if a user sets a preset event as a signal detection from a VIP belonging to a specific contact list, the first preset event and the second preset event may correspond to a message reception and a phone call reception, respectively. In particular, the first and second preset events differ from each other in type but have the same counterpart contact. In this case, after the controller 180 has detected the first preset event, while the touchscreen 151 is emitting light to the first area 1830, the controller 180 may control the touchscreen 151 to emit light to the second area 1833 in the same color displayed on the first area 1830. In this case, the second area may be adjacent to the first area. Therefore, a user recognizes the emitted light to the areas 1830 and 1833 and is then able to know that reception from the same contact in the contact list has occurred plural times.

The above-described example may be applicable to a case in which messages are received from different contacts belonging to the same contact list. For instance, in a case in which messages are received from different contacts A and B belonging to the specific contact list, the controller 180 may control the touchscreen 151 to emit light as shown in FIG. 19C. If the message is received from the contact A, the controller 180 may control the touchscreen 151 to emit light to the first area 1830. Thus, while the light is emitted to the first area 1830, if the message is received from the contact B, the controller 180 detects the message reception and is then able to control the touchscreen 151 to emit light to the second area 1833 in the same color displayed on the first area 1830.

Figure 19D:
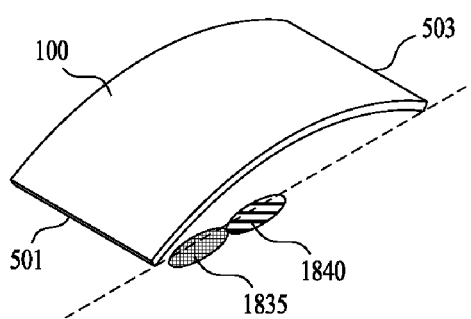

Referring to FIG. 19D, while the touchscreen 151 emits light to a first area 1835, if the controller 180 detects a second preset event different from a first preset event, the controller 180 may control the touchscreen 151 to emit light as shown in FIG. 19D. In particular, if the controller 180 detects the second preset event, the controller 180 may control the touchscreen 151 to emit light to another area different from the first area 1835 while maintaining the light emitting state of the area to which the light is emitted by the touchscreen 151 in case of the occurrence of the first preset event. Hence, the touchscreen 151 emits light to a second area 1840 while emitting the light to the first area 1835. In doing so, the controller 180 may control the touchscreen 151 to emit light in a manner that different lights are emitted to the first area 1835 and the second area 1840, respectively.

According to the above description, the type of the first preset event is different from that of the second preset event for example. In particular, while the controller 180 detects the first preset event, if the controller 180 detects the second preset event different from the first preset event, as shown in FIG. 19D, the touchscreen 151 may emit light. Yet, the example shown in FIG. 19D may be applied to a case in which the same preset event occurs. For instance, when a preset event includes an occurrence of a missed call from a VIP, if the missed call occurs once, the controller 180 may control the touchscreen 151 to emit light to the first area 1835. Thereafter, if the controller 180 detects 3 missed calls from the VIP (i.e., a cumulative count '3' of the missed calls), the controller 180 may control the touchscreen 151 to emit light to the second area 1840 in a color which is thicker, or of greater brightness or intensity, than that of the light emitted to the first area 1835.

FIGS. 20A-20D illustrate a process for a display of a mobile terminal to emit light differently depending on an amount of data transceived according to one embodiment. In particular, FIGS. 20A and 20B describe a transmitting side mobile terminal 100, while FIGS. 20C and 20D describe a receiving side mobile terminal 100.

Figure 20A:
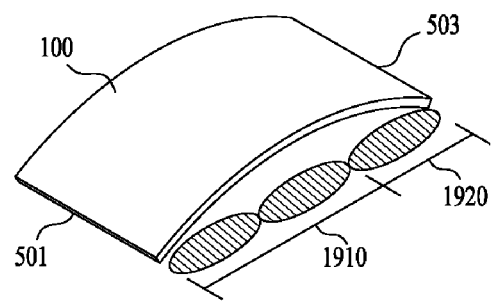
FIGS. 20A-20D illustrate a process for a display of a mobile terminal to emit light differently depending on a data transceived amount, according to one embodiment as broadly described herein.
Figure 20B:
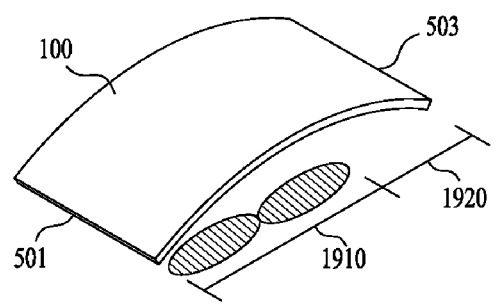

Referring to FIG. 20A, when a user designated direction is a right side, if a mobile terminal 100 is sending email or uploading data, the controller 180 may control the touchscreen 151 to display a data transmission status or a number/amount of data to be transmitted. And, the controller 180 may control the touchscreen 151 to emit light to areas 1910 and 1920 to correspond to an amount or number of data to be transmitted. Referring to FIG. 20B, the controller 180 may control the touchscreen 151 to emit light to the area 1910 corresponding to the amount (or number) of transmission standby data. In doing so, the controller 180 may control the touchscreen 151 so that light is not emitted to the area 1920 corresponding to the amount of the transmission completed data.

Figure 20C:
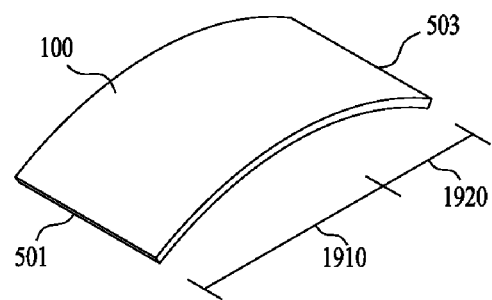
Figure 20D:
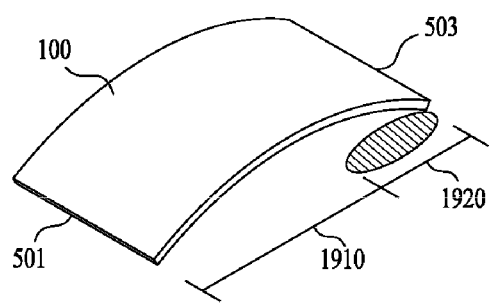

Referring to FIG. 20C, while the mobile terminal 100 is receiving mail or downloading data, the controller 180 may control a data reception status to be displayed through the touchscreen1 151. In particular, if a user designated direction is a right side, the controller 180 may control the touchscreen 151 so that light is not emitted while there is no amount or number of data received. Referring to FIG. 20D, the controller 180 may control the touchscreen 151 to emit light to the area 1920 corresponding to the amount (or number) of reception complete data. In doing so, the controller 180 may control the touchscreen 151 so that light is not emitted to the area 1910 corresponding to the amount of the reception standby data.

The descriptions with reference to FIGS. 20B and 20D may be applied to a case of data transceiving between mobile terminals 100. For instance, FIG. 20B provides one example of a mobile terminal currently transmitting data between mobile terminals currently performing short range wireless communications, and FIG. 20D provides one example of a mobile terminal currently receiving data. As data is transmitted, the area 1910 corresponding to the amount of the transmission standby data in FIG. 20B decreases but the area corresponding to the amount of the reception complete data in FIG. 20D increases.

Figure 21A:
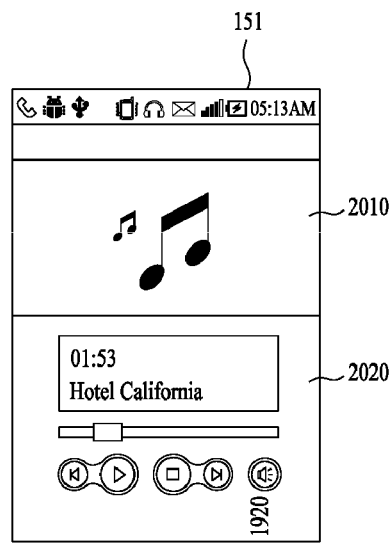
FIGS. 21A-21C illustrate a process for a display of a mobile terminal to emit light differently depending on a music genre or a play time, according to one embodiment as broadly described herein.
Figure 21B:
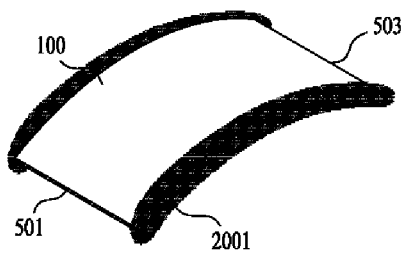
Figure 21C:
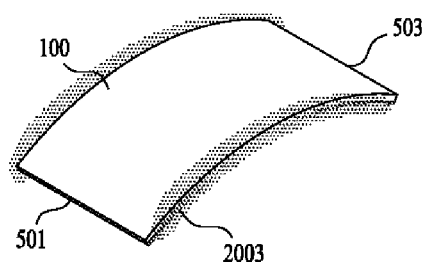

FIGS. 21A-21C describe a process for a display of a mobile terminal to emit light differently depending on a music genre or a play according to one embodiment as broadly described herein.

Referring to FIG. 21A, the controller 180 may control a player, which provides music play status information and plays music, to be displayed through the touchscreen 151 by receiving a user's input. In order to provide the music play status information, the controller 180 may control a region 2010 provided for sound visualization of a play status (e.g., a genre of music, a strength of sound, etc.) of currently played music, to be displayed in order to provide the music play status information. Moreover, the controller 180 may control a player 2020 provided to manipulate a play operation of the music to be displayed on the touchscreen 151. In FIG. 21A, a player 2020 providing information such as a song title, a play time and the like as well as allowing for manipulation of a play operation through play manipulating buttons is shown as an example.

Referring to FIGS. 21B and 21C, if the mobile terminal 100 currently plays music through the player, the controller 180 detects it as a preset event and then controls the touchscreen 151 to emit light differently depending on a sound strength, a music genre or a play time of the currently played music.

According to one embodiment, while specific music is currently played through a music player, when a part having a strong strength of sound is played, the controller 180 may control the touchscreen 151 to emit light a strong brightness level or thick color as shown in FIG. 21B. While the specific music is played, if a part having a weak strength of sound is played, the controller 180 may control the touchscreen 151 to emit light at a weaker brightness level than that shown in FIG. 21B or a thinner color than that shown in FIG. 21B, as shown in FIG. 21C.

Moreover, according to one embodiment, while specific music is currently played through a music player, the controller 180 may control the touchscreen 151 to emit light in a manner of changing the brightness or color of the light emitted by the touchscreen 151 in a period between a point of starting to play the specific music and a point of ending the play time. For instance, at a point in time at which the specific music starts to be played, referring to FIG. 21B, the controller 180 may control the touchscreen 151 to emit light in thick color. As the play time passes, the controller 180 may control the touchscreen 151 to emit light in a manner that the color of the light emitted by the touchscreen 151 becomes gradually thinner. In this case, when the play time is almost at an end, referring to FIG. 21C, the controller 180 may control the touchscreen 151 to emit light in a thin color.

According to one embodiment, if specific music currently played through a music player is, for example, rock music or dance music having a strong beat, referring to FIG. 21B, the controller 180 may control the touchscreen 151 to emit light at a strong brightness level or thick color. When the music played by the player is changed in the course of playing the specific music, if a genre of the changed music, for example, ballad, instrumental, and the like having a beat that is weaker than those of the previously played specific music, referring to FIG. 21C, the controller 180 may control the touchscreen 151 to emit light at a brightness level that is weaker than that shown in FIG. 21B or a color that is thinner than that shown in FIG. 21B.

According to the above embodiment, the method for the controller 180 to emit light in a manner of changing a color or a brightness level may include a method of using the visualization region 2010 displayed on the touchscreen 151. In the course of playing a music selection, unlike the case shown in FIGS. 15A-15D, the controller 180 may control the visualization region 2010 and the player 2020 remain displayed despite that the mobile terminal 100 is in the face-down mode. In doing so, the controller 180 may control various visual effects to be displayed on the touchscreen 151 in accordance with at least one of a genre of music, a sound strength and a play time through the visualization region 2010. Hence, a user may see light emitted through a space between the touchscreen 151 and the surface the mobile terminal 100 is received due to the visual effect. Through the light emitted due to the visual effect, the user may experience the visual effect of the music player in the face-down mode of the mobile terminal 100 without actually watching the screen displayed on the music player at a front side of the touchscreen 151.

According to the above embodiment with respect to the music player playback described with reference to FIGS. 21A-21C, in the mobile terminal 100 in the face-down mode, it may be further effective when a speaker is provided at the rear side of the mobile terminal 100. Moreover, in a case in which the speaker is provided at the rear side of the mobile terminal 100, if a preset event is a phone call through a speakerphone, the controller 180 may control the touchscreen 151 to emit light in order to indicate that a user is making a phone call using the speakerphone. Moreover, the controller 180 may control the touchscreen 151 to emit light in a manner of changing a brightness or a color as a call time through the speakerphone passes. For instance, the controller 180 may control the touchscreen 151 to emit light in a manner of getting gradually brighter each time 10 minutes of call time passes. According to the above description with reference to FIGS. 21A-21C, for example, the touchscreen 151 emits light if a user designated direction is not set. Yet, if the user designated direction is set, the controller 180 may control the touchscreen 151 to emit light to correspond to the set user designated direction.

Figure 22A:
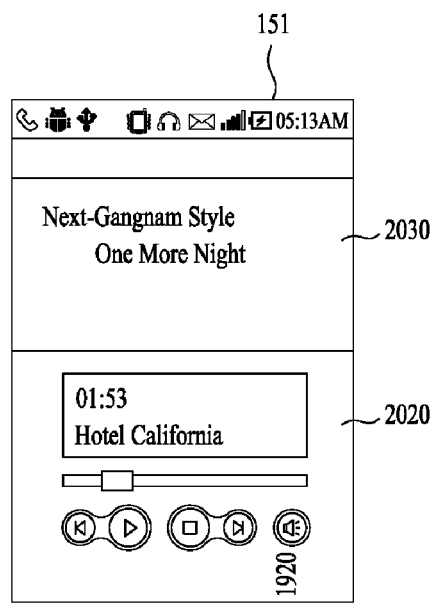
FIGS. 22A-22B illustrate a process for a display of a mobile terminal to emit light by changing a region depending on a music genre on a play list, according to one embodiment as broadly described herein.
Figure 22B:
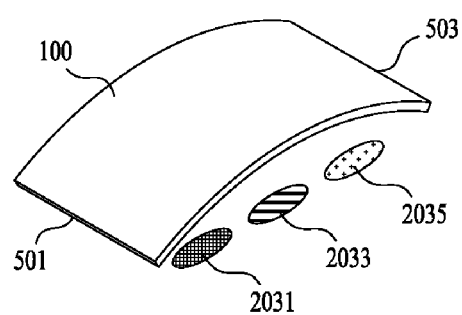

FIGS. 22A-22B describe a process for a display of a mobile terminal to emit light by changing a region depending on a music genre of a play list according to one embodiment.

Referring to FIG. 22A, the controller 180 may control a player 2020, which may display a play list 2030 on the touchscreen 151, to be displayed in response to a user's input. In particular, the controller 180 may control songs, which are scheduled to be played next, to be displayed in a list form 2030.

Referring to FIG. 22B, the controller 180 may control the touchscreen 151 to emit light in a specific color 2031 from a partial region of the touchscreen 151 to correspond to a currently played song 'Hotel California'. A user may be aware of a genre of the currently played song through the emitted light in the specific color 2031. And, the controller 180 may control the touchscreen 151 to emit light to correspond to a genre of a song scheduled to be played by the player. In particular, the controller 180 may control prescribed regions of the touchscreen 151 to emit light in different colors in accordance with genres of music existing in the play list 2030. Through this, the user may recognize the genres of the music existing in the play list in order as well as a currently appreciated music.

Figure 23A:
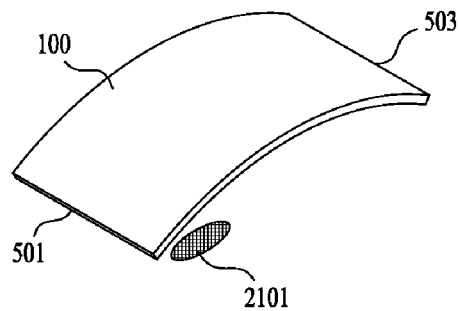
FIGS. 23A-23C illustrate a process for a display of a mobile terminal to emit light by changing a light-emitting size depending on a face-down mode duration time in the event of a timer operation execution in face-down mode of the mobile terminal, according to one embodiment as broadly described herein.
Figure 23B:
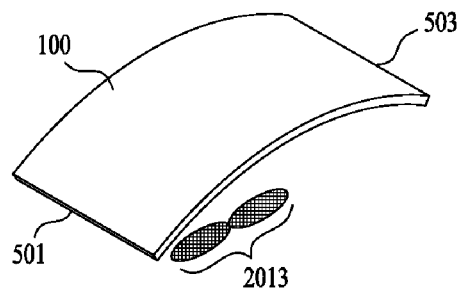
Figure 23C:
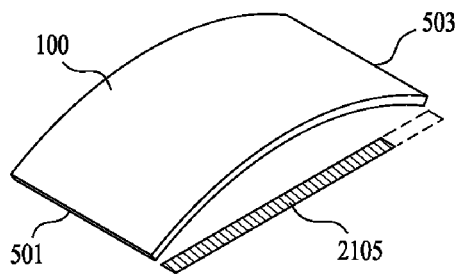

FIGS. 23A-23C describe a process for a display of a mobile terminal to emit light by changing a light-emitting size depending on a face-down mode duration time in the event of a timer operation execution in a face-down mode of the mobile terminal 100 according to one embodiment.

If the mobile terminal 100 is turned over by a user, the mobile terminal 100 may enter a face-down mode. While a user is in, for example, a meeting or class, the user may obtain time information in the face-down mode of the mobile terminal 100. Referring to FIGS. 23A and 23B, if the mobile terminal 100 enters the face-down mode, the controller 180 may control the touchscreen 151 to emit light to correspond to a time that the face-down mode has been maintained.

For instance, if 10 minutes have elapsed since the mobile terminal 100 entered the face-down mode, the controller 180 may control the touchscreen 151 to emit light as shown in FIG. 23A, in which a prescribed region of the touchscreen 151 emits light in response to the elapsed time in the face-down mode. Hence, the touchscreen 151 may emit light to an area 2101. Thereafter, if another 10 minutes elapse, the controller 180 may control the touchscreen 151 to emit light as shown in FIG. 23B, in which light is emitted to an area 2103 wider than that shown in FIG. 23A. Thus, a time for enabling the touchscreen 151 to emit light by increasing its region may be determined by a user setting.

FIG. 23C describes a case in which the touchscreen 151 emits light in accordance with a continuous time flow, unlike the former case in which the light emitting region of the touchscreen 151 increases by prescribed time units of the timer set by a user.

Referring to FIG. 23C, the controller 180 may control the touchscreen 151 to emit light to a continuous area 2015 in response to a time a face-down mode is maintained. Hence, a user may check a flow of a continuous time for maintaining the face-down mode of the mobile terminal 100. If the controller 180 detects an elapse of a preset time, the controller 180 may control a light emitting region of the touchscreen 151 to increase continuously and gradually in response to the detected time. If the preset time elapses, the controller 180 may adjust the light emitting region of the touchscreen 151 to enable the light to be emitted all over the continuous area 2015. The timer function may be activated by an execution command through a user's input. Alternatively, the timer function may be automatically activated when the controller 180 first detects the face-down mode.

The above-described embodiment may be applied to all kinds of embodiments for adjusting a light emitting region of the touchscreen 151 based on a specific amount that may be measured by the controller 180.

For instance, referring to FIGS. 23A-23C, if a preset event is a check on a remaining power level of the mobile terminal 100, the controller 180 may control the touchscreen 151 to emit light in a manner of changing its light emitting region differently depending on a measured remaining power level. If a preset event is a check on a charged level of the mobile terminal 100 when charging the mobile terminal 100, the above embodiment may be applied. In particular, the controller 180 may adjust a light emitting region of the touchscreen 151 depending on the charged level of the mobile terminal 100. Hence, the area 2101 to which the touchscreen 151 emits light in FIG. 23A may extend to the area 2103 shown in FIG. 23B as the charged level of the mobile terminal 100 increases. Moreover, referring to FIG. 23C, the controller 180 may control the touchscreen 151 to continuously display that the charged level of the mobile terminal 100 is increasing.

If a preset event includes playing of a multimedia item, the controller 180 may control the touchscreen 151 to emit light in a manner of changing a light emitting region of the touchscreen 151 depending on a measured play time of a currently played multimedia item. By matching a full play time of a multimedia item to a full light emitting region of the touchscreen 151, the controller 180 may control the touchscreen 151 to emit light in a manner of increasing the light emitting region, as shown in FIG. 23B, after emitting light, as shown in FIG. 23A, with each lapse of a predetermined amount of time in the play time. And, a flow of the play time may be displayed as a continuous time flow shown in FIG. 23C.

Figure 24A:
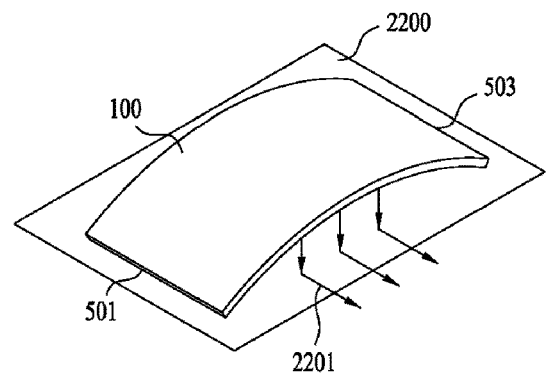
FIGS. 24A-24C illustrate a process for a display of a mobile terminal to output time information inversely in the event of a current time output, when the mobile terminal is placed on a specific floor surface, according to one embodiment as broadly described herein.
Figure 24B:
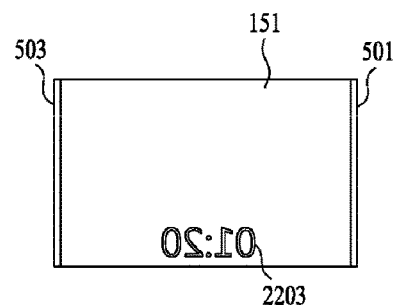
Figure 24C:
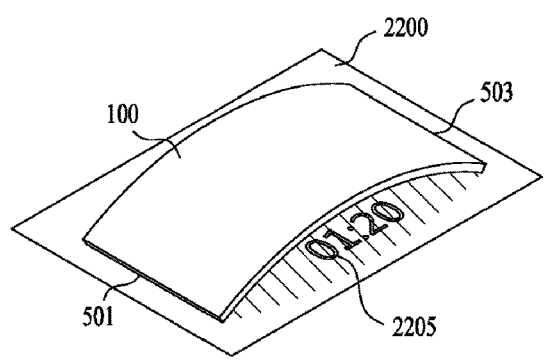

FIGS. 24A-24C describe a process for a display of a mobile terminal to output time information inversely in a case of a current time output, when the mobile terminal is placed on a specific surface, according to one embodiment as broadly described herein.

In face-down mode of the mobile terminal 100, when the controller 180 may control the touchscreen 151 to emit light, the emitted light may be reflected depending on a material of a surface on which the mobile terminal 100 is received.

In particular, when the surface having the mobile terminal 100 thereon is a glass material, if the touchscreen 151 emits light, the emitted light may be reflected by the surface of the glass material with a specific amount at a specific angle.

Referring to FIG. 24A, if the controller 180 detects a preset event, the controller 180 may control the touchscreen 151 to emit light. In doing so, the emitted light may be reflected by the floor surface 2200. A user may confirm an event of the mobile terminal 100 based on the light leaking through a space between the touchscreen 151 and the surface 2200. Yet, if the event of the mobile terminal 100 is confirmed through a reflective light 2201, as in the present embodiment, further specific information may be obtained. The controller 180 may determine a material of the surface 2200 having the mobile terminal 100 thereon using the sensing device 140. Particularly, the sensing device 140 may include a photosensor and may obtain a material of the surface by measuring a reflexibility of the light emitted toward the surface. If the reflexibility over a prescribed range is measured, when the touchscreen 151 emits light in response to a preset event, the controller 180 may control a display screen of the touchscreen 151 to be outputted in an inverted manner.

FIG. 24B describes a display screen inversely output by the touchscreen 151. When a user intends to check current time information, if a specific input is applied through the user input device 130, the controller 180 may control the current time information to be output through the touchscreen 151. Yet, while still in the face-down mode, time information at a front side of the touchscreen 151 cannot be checked. Yet, if the light 2201 emitted by the touchscreen 151 is reflected by the surface 2200, as shown in FIG. 24A, the user may confirm the current time information through the reflected light 2201. Referring to FIG. 24B, in the face-down mode, the controller 180 may control a current time to be output by the touchscreen 151 inverted. In the face-down mode, although the touchscreen 151 faces the receiving surface, if the controller 180 detects a preset event, the controller 180 may control the touchscreen 151 to emit light. If the preset event is to detect a user input for checking a current time value, the controller 180 may control current time information to be output from a prescribed region of the touchscreen 151. In particular, the controller 180 detects the material of the surface 2200 through the sensing device 140, and if the material is determined to be capable of reflecting the light emitted from the touchscreen 151, the controller 180 may control the current time information to be output in an inverted manner. In doing so, the controller 180 determines the reflexibility of the surface 2200 and the like and may then control the current time information to be displayed on a prescribed region of the touchscreen 151. In particular, the controller 180 may control the current time information, which is provided by the light emitted by the touchscreen 151, to be displayed inversely and distortedly in accordance with the determined reflexibility of the surface 2200 and the like. In particular, the controller 180 may control the current time information to be displayed such that an exterior 2203 of the current time information, that is, a shape, color, brightness, size and the likes is changed. Through this, the receiving surface 2200 may play a role as the touchscreen 151 instead. Referring to FIG. 24C, if the touchscreen 151 displays the current time information 2203 in the inverted form, an image 2205 of the current time information is projected in a non-inverted form on the surface 2200. Hence, as the projected image is reflected, a user may confirm the current time information in the non-inverted form.

According to the above-described embodiment, a preset event may include, for example, a current time check. Yet, the above-described embodiment is applicable irrespective of types of the preset event if a material of a receiving surface is able to reflect the light emitted by the touchscreen 151.

Figure 25A:
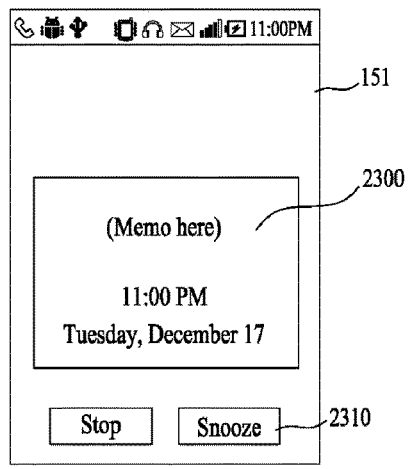
FIGS. 25A-25C illustrate a process for a display of a mobile terminal to emit light differently depending on a snooze time in the event of an alarm output, when a snooze function is activated by a touch gesture, according to one embodiment as broadly described herein.
Figure 25B:
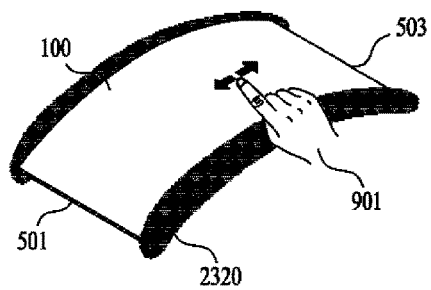
Figure 25C:
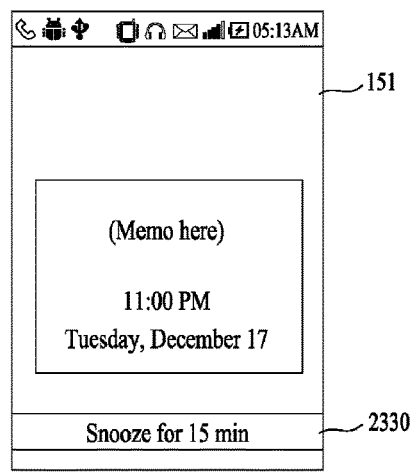

FIGS. 25A-25C describe a process for a display of a mobile terminal to emit light differently depending on a snooze time in the event of an alarm output, when a snooze function is activated by a touch gesture, according to one embodiment.

Referring to FIG. 25A, if an alarm time previously set by a user expires, the controller 180 outputs an alarm and may control an alarm screen to be displayed on the touchscreen 151. In this case, the alarm output includes at least one of an audio output through the audio output module 152 and/or a vibration output through the alarm 153 and/or an alarm output through the touchscreen 151. The user detects the alarm through the alarm output. Subsequently, the user terminates the alarm output or activates an alarm snooze function, through a manipulation of a function key 2310 included in the alarm output screen displayed on the touchscreen 151. In this case, the alarm snooze function may generate an alarm output again after a predetermined time has elapsed with reference to a preset alarm time. Yet, if the mobile terminal 100 is in face-down mode, although an alarm output event is output through the touchscreen 151, the user is unable to manipulate the alarm output screen through the touchscreen 151. FIG. 25B provides one example of a method of activating a snooze function while the mobile terminal 100 is outputting an alarm in face-down mode. Referring to FIG. 25B, in the course of the alarm output, the controller 180 may control the touchscreen 151 to emit light in response to the alarm output event. In doing so, although the controller 180 may control the touchscreen 151 to emit light to both sides (i.e., right and left sides of the mobile terminal 100), as shown in FIG. 25B, if a user designated direction is set, the controller 180 may control a prescribed region of the touchscreen 151 to emit light only. Thus, in the course of the alarm output, if the user generates a sound by applying a touch gesture to an outer surface of the mobile terminal 100, the controller 180 detects it through the second sensing device and is then able to control a snooze function to be activated. In particular, if the user generates a sound by applying a touch gesture to a rear side of the mobile terminal 100, the controller 180 activates the snooze function and is then able to control a snooze time of the snooze function to be adjusted in response to at least one of a region for detecting the sound generated by the touch gesture or a duration time of the generated sound. In order for the user to check the adjusted snooze time, the controller 180 may control the touchscreen 151 to emit light, as shown in FIG. 17A, by changing at least one of a color and/or brightness of the touchscreen 151 in response to the adjusted snooze time. And, the controller 180 may control the touchscreen 151 to emit light, as shown in FIGS. 21A-21C by changing a region from which the touchscreen 151 emits light in response to the adjusted snooze time. For instance, if the snooze time is set to 5 minutes, the controller 180 may control the touchscreen 151 to emit light as shown in FIG. 23A. For another instance, if the snooze time is set to 10 minutes, the controller 180 may control the touchscreen 151 to emit light as shown in FIG. 23B.

FIG. 25C provides one example of an alarm output screen displayed on the touchscreen 151 if a sound is generated by a touch gesture applied to the rear side of the mobile terminal 100. While an alarm is output, if the controller 180 detects that a sound is generated by a touch gesture applied to the rear side of the mobile terminal 100, the controller 180 may activate a snooze function and adjust a snooze time. In doing so, the controller 180 may control a snooze setting 2330 to be displayed on the touchscreen 151.

FIGS. 26A-26D describe a process for a display of a mobile terminal to emit light differently depending on a recording progress status in the event of an audio recording operation execution.

Figure 26A:
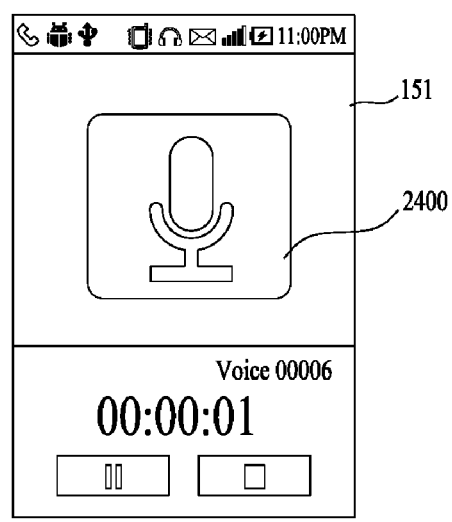
FIGS. 26A-26D illustrate a process for a display of a mobile terminal to emit light differently depending on a recording progress status in the event of execution of an audio recording operation.
Figure 26B:
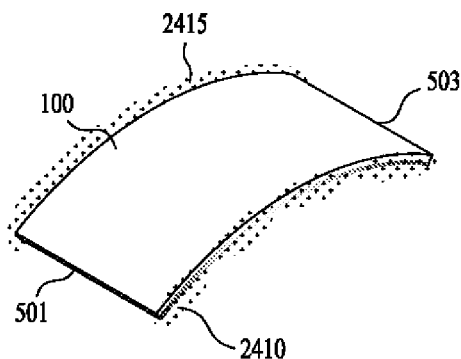

Referring to FIGS. 26A-26B, if a preset event is a recording program activation, referring to FIG. 26A, the controller 180 controls a recording program activated screen 2400 to be displayed through the touchscreen 151. If a user activates a recording program and then turns over the mobile terminal 100, referring to FIG. 26B, the controller 180 detects a face-down mode and is able to control the touchscreen 151 to emit lights 2410 and 2415. Through this, the user may be aware that a recording is in progress in the mobile terminal 100. In order to inform the user that the recording remains in progress, the controller 180 may control the touchscreen 151 to emit light in a specific color. Since this may be enough for the user to check that the recording is in progress, the controller 180 may previously set the mobile terminal 100 so that it does not keep emitting light through the touchscreen 151. In doing so, in order for the user to recognize that the recording is in progress, the controller 180 may control the touchscreen 151 to emit light at predetermined intervals. For instance, each time a recording progress time/interval elapses, the controller 180 may control the touchscreen 151 to emit light. For another instance, the controller 180 may control the touchscreen 151 to emit light for each specific time unit in which a recording is in progress. FIG. 26B shows one example of a case in which the controller 180 may control the touchscreen 151 to emit lights 2410 and 2415 in both side directions of the mobile terminal 100. If a user designated direction is set to a right direction of the mobile terminal 100, the controller 180 may control the touchscreen 151 to emit light 2410 in the right direction of the mobile terminal 100.

Assuming that a method of setting a user designated direction includes a method for the controller 180 to recognize a sound through the second sensing device, if a direction of a recorded sound is different from the user designated direction, the controller 180 may change the user designated direction into the recorded sound direction. In order to prevent the user designated direction from being changed, the previously described user designated direction lock function may be enabled. Hence, if a user designated direction is set to a specific direction by a user and a user designated direction lock function is enabled, the controller 180 may fix the user designated direction to the corresponding direction. In this case, even if the recorded sound direction is different from the user designated direction, the user may check a recording progress status in the user designated direction as the touchscreen 151 emits light. Moreover, aside from the user designated direction lock function, as previously described, a sound for the user designated direction setting may be set to a user voice in advance. If the controller 180 detects a voice matching a preset user voice in a specific direction, the controller 180 sets the user designated direction to the specific direction. And, the user designated direction is not changed despite detecting a sound recorded in other directions.

Figure 26C:
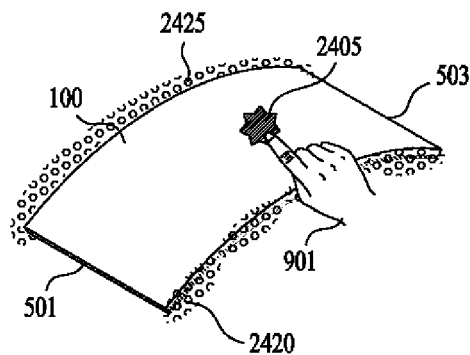

FIG. 26C provides one example to describe a method of controlling a voice recording status using a touch through a touch gesture applied to a rear side of the mobile terminal 100.

Referring to FIG. 26C, if a touch gesture 901 is applied to the rear side of the mobile terminal 100, a sound is generated. The controller 180 is then able to control a currently active recording program by detecting the generated sound. For instance, if a user applies a tap input 901 as the touch gesture to the rear side of the mobile terminal 100, the controller 180 detects a sound generated through the applied tap input 901, recognizes the detected sound as a recording pause command, and is then able to pause the recording in progress. Moreover, if the tap input 901 is applied twice in a prescribed time, the controller 180 detects a sound generated through the tap input 901 applied twice, recognizes the detected sound as a recording end command, ends the recording in progress, and controls a recording file to be saved. On the other hand, after a sound has been generated by a touch gesture applied once, if another touch gesture is applied after elapse of the prescribed time, a sound is generated. If the sound is generated, the controller 180 may control the paused recording to be resumed.

In doing so, the controller 180 may control the touchscreen 151 to emit light 2420 by changing at least one of a color, a brightness and/or a pattern of the touchscreen 151 in response to such an event as a recording pause, a recording end and the like, as shown in FIG. 26C. In a case in which the controller 180 resumes the paused recording, the controller 180 may control the touchscreen 151 to emit light as shown in FIG. 26B. In particular, the controller 180 may control the touchscreen 151 to emit light differently depending on a type of a recording event. Therefore, a user may confirm a recording progress status.

Figure 26D:
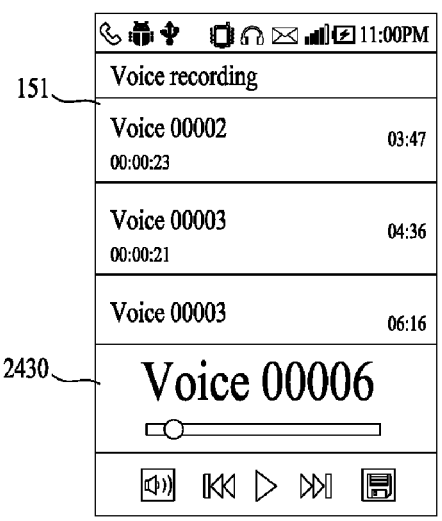

FIG. 26D provides one example of a recording paused screen.

Referring to FIG. 26D, while the recording is in progress under the control of a recording program using a sound through the touch gesture shown in FIG. 26A, if the recording is paused, the controller 180 may control a recording paused screen to be displayed on the touchscreen 151.

FIGS. 27A-27D describe a method of outputting a corresponding notification in the event of a specific task incomplete detection according to one embodiment.

Figure 27A:
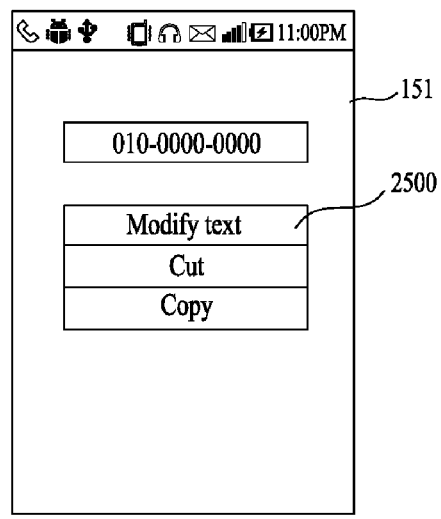
FIGS. 27A-27D illustrate a method of outputting a corresponding notification in the case of a specific job incomplete detection, according to one embodiment as broadly described herein.
Figure 27B:
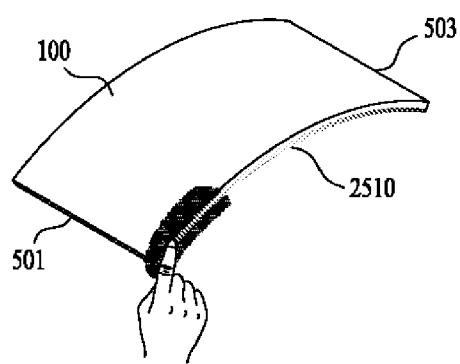
Figure 27C:
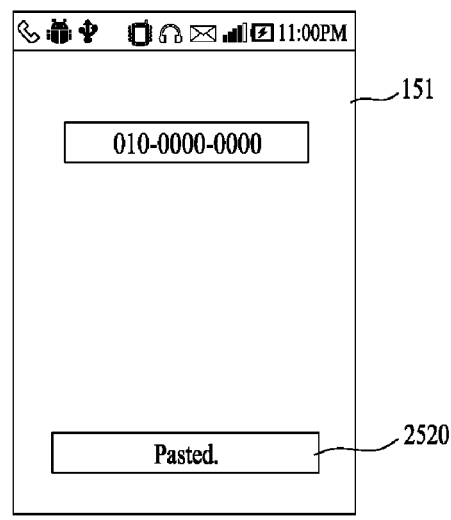
Figure 27D:
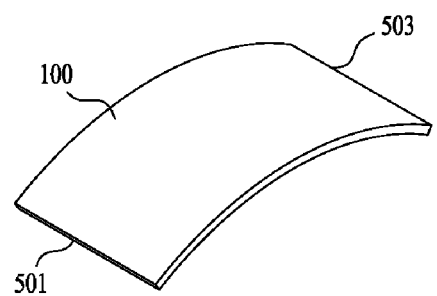

When a user performs a specific task or job using the mobile terminal 100, the controller 180 may control a task or job window, which is provided to perform the specific task or job, to be displayed through the touchscreen 151. As one example of the job window for doing the specific job, FIG. 27A shows an editing window 2500 used in performing a text editing job. In this case, the editing window 2500 is partitioned into separate regions for functions of text modification, cutting, copy and the like. The controller 180 may control the editing window 2500 to be displayed through the touchscreen 151. In doing so, if a user applies a touch gesture to one of the separate regions for the respective functions, the controller 180 does a corresponding editing job. Yet, the editing job through the editing window 2500 may require a subsequent job. For instance, the text modification function may require a post-modification saving job. The cutting function may require a job of pasting a text on another region after cutting the text. The copy function may require a job of pasting a text on another region after copying the text. If the user fails to perform the subsequent job, the corresponding job enters an incomplete state. When the mobile terminal 100 is in face-down mode, if the controller 180 detects a job incompletion, referring to FIG. 27B, the controller 180 may control a prescribed region of the touchscreen 151 to emit light. In particular, the controller 180 may control the touchscreen 151 to emit light in a manner of changing at least one of a color, brightness, wavelength and/or pattern of the touchscreen 151 in response to a type of the incomplete job. Moreover, the above-described embodiment may be applied to a case in which the controller 180 detects that a specific job is incomplete in the face-down mode. For instance, while the mobile terminal is doing a data download/upload job, if a user turns over the mobile terminal 100, the controller 180 detects the face-down mode. While the mobile terminal 100 is doing the data download/upload job, if the controller 180 detects a job incompletion due to a data download/upload failure, the controller 180 may control the touchscreen 151 to emit light. Through the light emission of the touchscreen 151, the user may recognize that there is an incomplete job. Yet, although the user does not intend to do a subsequent job in the incomplete job, if the touchscreen 151 continues emitting light, it may cause inconvenience to the user. To solve such a problem, if a touch gesture is applied to the prescribed region 2510 of the touchscreen 151 currently emitting light in response to the incomplete job, as shown in FIG. 27B, the controller 180 controls the touchscreen 151 to be released from the corresponding incomplete job notification. In particular, if the controller 180 detects a sound attributed to a user's touch gesture or a vibration generated from the corresponding region 2510, referring to FIG. 27D, the controller 180 may control the touchscreen 151 not to emit light. Aside from the user's touch gesture, if the incomplete job is completed by the user as shown in FIG. 27C, the controller 180 may control the touchscreen 151 not to emit light, as shown in FIG. 27D.

FIG. 28A describes a method for a mobile terminal to recognize a color of a surface on which the mobile terminal is received, according to one embodiment.

In FIG. 28A (a), a user places the mobile terminal 100 on a receiving surface 2550. The user is able to move the top end portion 503 of the mobile terminal 100 toward a the receiving surface 2550 while getting a grip 2555 on the mobile terminal 100. In doing so, the controller 180 may detect a shift of the top end portion 503 of the mobile terminal through a gyro sensor or an accelerometer sensor. Moreover, if a shift trace 2560 of the top end portion 503 exceeds a speed or distance in a preset range, the controller 180 may detect that the mobile terminal 100 is entering a face-down mode.

Referring to FIG. 28A (b), an inclination of the mobile terminal 100 is greater than that of the mobile terminal 100 shown in FIG. 28A (a) because of the shift of the top end portion 503. In this case, the controller 180 may detect that the mobile terminal 100 is entering a face-down mode. Hence, the controller 180 may detect a color 2553 of the receiving surface 2550 using, for example, a photosensor provided to the front side of the mobile terminal 100. In this case, the photosensor may include, for example, an RGB sensor and an illumination sensor. For the implementation of the present embodiment, a separate photosensor may be provided to the front side of the mobile terminal 100. Alternatively, the camera 121 provided to the front side of the mobile terminal 100 may be used instead of the separate photosensor.

FIG. 28B describes a process for a display of a mobile terminal to output light by adjusting color of the light, brightness of the light and/or the like depending on an ambient light, according to one embodiment.

Referring to FIG. 28B (a) and FIG. 28B (b), if the mobile terminal 100 is put on a receiving surface having specific color 2601/2605, the controller 180 may detect the color of the surface through the sensing device 140. In this case, the sensing device 140 may include, for example, a photosensor.

And, the controller 180 may detect the color 2601/2605 of the receiving surface through the photosensor. In doing so, in order to detect the color of the surface, the controller 180 may use the former method described with reference to FIG. 28A. In this case, if the controller 180 detects a preset event of the mobile terminal 100, the controller 180 may control the touchscreen 151 to emit light in a particular color 2603/2607 corresponding to the detected color 2601/2605 of the receiving surface. In particular, the controller 180 may control the touchscreen 151 to emit light in the color 2603/2607 in contrast to the color 2601/2605 of the receiving surface. For instance, the color 2601/2605 of the receiving surface may be complementary to the color 2603/2607 of the light emitted by the touchscreen 151. For instance, when the mobile terminal 100 is put on a yellow surface, if a phone call is received from a VIP as a preset event, the controller 180 may control the touchscreen 151 to emit light in deep blue that is a complementary color of yellow.

Referring to FIG. 28B (c) and FIG. 28B (d), in the face-down mode of the mobile terminal 100, the controller 180 may control the touchscreen 151 to emit light by changing a brightness of the touchscreen 151 depending on a brightness 2609/2613 of an ambient light. The controller 180 may detect the brightness of the ambient light through the sensing device 140, and more particularly, through a photosensor. In this case, if the controller 180 detects a preset event, the controller 180 may control the touchscreen 151 to emit light 2611/2615 in response to the detect brightness of the ambient light. In a case in which the ambient light is bright, when the controller 180 may control the touchscreen 151 to emit light by detecting the preset event, if the touchscreen 151 emits a thin light, it may be difficult for a user to check a presence or non-presence of an event occurrence. On the other hand, in a case in which the ambient light is dark, when the controller 180 may control the touchscreen 151 to emit light by detecting the preset event, if the touchscreen 151 emits a thick light, it may consume excessive power. Hence, if the ambient light 2609 is bright, in order for a user to confirm the occurrence of the preset event, the controller 180 may control the touchscreen 151 to emit light brightly. In particular, the controller 180 may control the touchscreen 151 to emit light brighter than that of the ambient light measured through the sensing device 140.

Moreover, if the ambient light dims/darkens, the controller 180 may control the touchscreen 151 to emit a thin light 2615 sufficient for the user to confirm the occurrence of the preset event. In particular, the controller 180 may control the touchscreen 151 to emit a light brighter than that of the ambient light measured through the sensing device 140, but only as much as necessary.

For instance, if the preset event includes a power charging of the mobile terminal 100, the controller 180 detects the mobile terminal 100 is being charged with power and is then able to control a prescribed region of the touchscreen 151 to emit light. In doing so, the controller 180 may control the sensing device 140 to sense a brightness, color and the like of the ambient light. The controller 180 may control the brightness of the light emitted by the touchscreen 151 to be adjusted in response to the ambient light brightness sensed by the sensing device 140. In an environment having a bright ambient light, the controller 180 detects that the ambient light is bright through the sensing device 140 and is then able to control the touchscreen 151 to emit light as shown in FIG. 28B (c). In particular, the controller 180 controls the light emitted by the touchscreen 151 to be brighter than the ambient light, thereby enabling a user to confirm that the mobile terminal 100 is being charged. On the contrary, when the mobile terminal 100 is charged in a dark environment, the controller 180 detects that the ambient light is dark through the sensing device 140 and is then able to control the touchscreen 151 to emit light as shown in FIG. 28B (d). Therefore, the user may be hindered less by the light emitted by the touchscreen 151. As mentioned in the above description, while the touchscreen 151 emits light in the course of charging the mobile terminal 100, if the controller 180 detects a charging completion, the controller 180 may control the touchscreen 151 not to emit light. Therefore, the user may be aware that the mobile terminal 100 is charged completely by confirming that the touchscreen 151 does not emit light.

FIGS. 29A-29D describe a process for a display of a mobile terminal to output a notification in the event of a charged status detection of the mobile terminal, according to one embodiment.

Figure 29A:
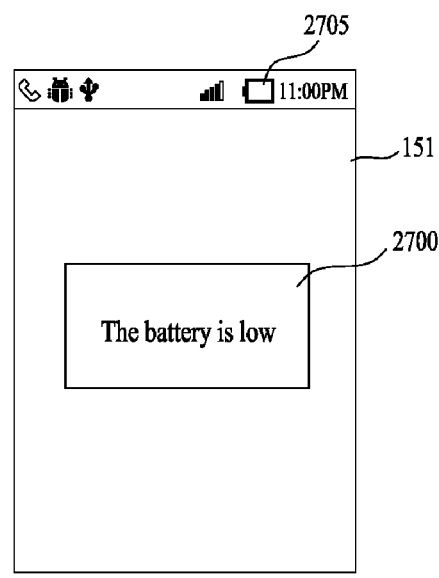
FIGS. 29A-29D illustrate a process for a display of a mobile terminal to output a notification in the case of a charged status detection of the mobile terminal, according to one embodiment as broadly described herein.
Figure 29B:
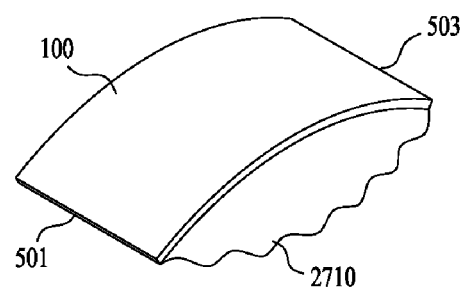

Referring to FIG. 29A, if the controller 180 detects that a remaining power level of the mobile terminal 100 is less than or equal to a prescribed level, the controller 180 may control a notification window 2700, which indicates that charging is necessary, to be displayed through the touchscreen 151. When the mobile terminal 100 is in face-down mode, if the face-down mode is maintained for a long term, it may be difficult for a user to recognize that a remaining power of the mobile terminal 100 is insufficient. Hence, when the user intends to manipulate the mobile terminal 100 by releasing the mobile terminal 100 from the face-down mode, it may happen that the user is unable to use the mobile terminal 100 due to the power shortage of the mobile terminal 100. Referring to FIG. 29B, if the controller 180 detects that a remaining power level of the mobile terminal 100 is less than or equal to a prescribed level, the controller 180 may control the touchscreen 151 to emit light 2710 to indicate that the mobile terminal 100 needs to be charged. In particular, the controller 180 may control the touchscreen 151 to emit light depending on the remaining power level in response to a user setting or a manufacturer's intention. For instance, if the remaining power level of the mobile terminal 100 is less than or equal to 10%, the controller 180 may control the touchscreen 151 to emit light in a manner of changing a color and/or brightness of the emitted light.

Figure 29C:
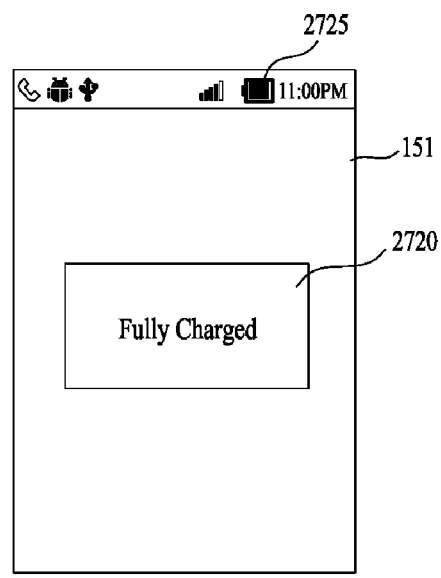
Figure 29D:
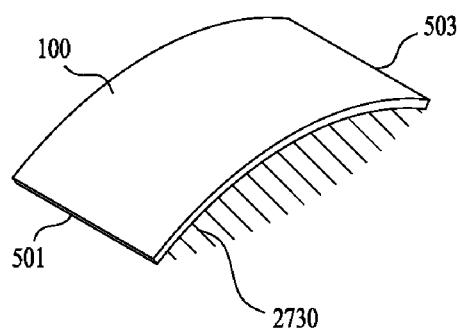

Referring to FIG. 29C, if the controller 180 detects that a remaining power level of the mobile terminal is greater than or equal to a prescribed level, the controller 180 determines a charging complete status and is then able to control a notification window 2720, which indicates that the charging is complete, to be displayed through the touchscreen 151. And, the controller 180 may control an emoticon 2725 of a fully-charged battery to be displayed on the touchscreen 151. When the mobile terminal 100 is in the face-down mode, it is difficult for a user to recognize a charging completion of the mobile terminal 100. Thus, since the user is unable to recognize whether the mobile terminal 100 is charged completely, the mobile terminal 100 may keep being charged unnecessarily. Referring to FIG. 29D, if the controller 180 detects that a remaining power level of the mobile terminal is greater than or equal to a prescribed level, the controller 180 may control the touchscreen 151 to emit light 2730 in order to indicate that the charging of the mobile terminal 100 is complete. In particular, the controller 180 may control the touchscreen 151 to emit light depending on the remaining power level in response to a user setting or a manufacturer's intention. For instance, if the remaining power level of the mobile terminal 100 is greater than or equal to 80% or 90%, the controller 180 may control the touchscreen 151 to emit light in a manner of changing a color and/or brightness of the emitted light.

As discussed with reference to FIG. 28B (c) and FIG. 28B (d), if the controller 180 detects the charging complete status, the controller 180 may control the touchscreen 151 not to emit light. As shown in FIG. 29D, in case of the charging completion, the controller 180 may control the touchscreen 151 to emit light. In accordance with a user setting, the mobile terminal 100 may adopt one of the two embodiments. Alternatively, while the charging is in progress, the controller 180 may control the touchscreen 151 to keep emitting light. If the charging is complete, the controller 180 may control the touchscreen 151 to emit light in color or brightness different from that in the former charging (e.g., the touchscreen 151 may emit light as shown in FIG. 28B (b)) for a predetermined time in order to indicate the charging completion as shown in FIG. 29D. If the predetermined time elapses, the controller 180 may control the touchscreen 151 not to emit light.

FIGS. 30A-30D describe an operation of controlling a light emission amount of a display of a mobile terminal according to one embodiment.

Figure 30A:
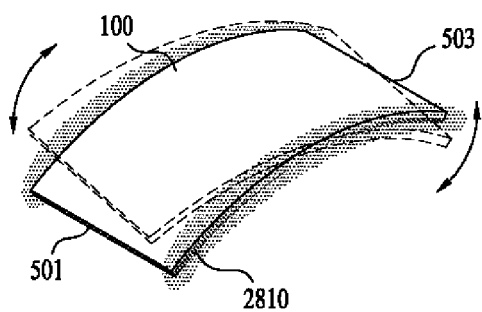
FIGS. 30A-30D illustrate an operation of controlling a light emission amount of a display of a mobile terminal according to one embodiment as broadly described herein.
Figure 30B:
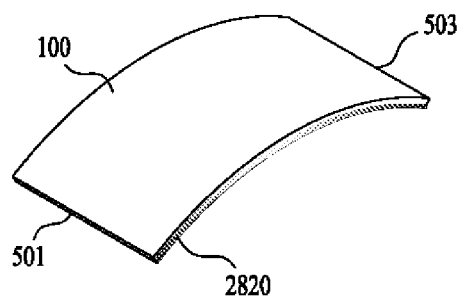

Referring to FIGS. 30A and 30B, in face-down mode, a user may conveniently disable/enable the face-down mode by shaking the mobile terminal 100 in right and left directions. Referring to FIG. 30A, when the mobile terminal 100 is in the face-down mode, if the controller 180 detects a preset event, the touchscreen 151 emits light. In doing so, if a user shakes the mobile terminal 100 in the right and left directions in order to disable the face-down mode, referring to FIG. 30B, the controller 180 detects the action of disabling the face-down mode and is then able to control the touchscreen 151 not to emit light. While the face-down mode is disabled, if the mobile terminal 100 is shaken in the right and left directions, as shown in FIG. 30A, the controller 180 detects it as a command for enabling the face-down mode again and is then able to enable the face-down mode.

Figure 30C:
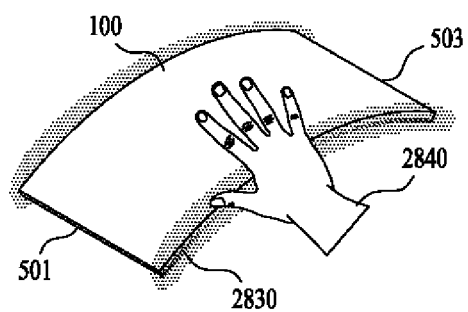
Figure 30D:
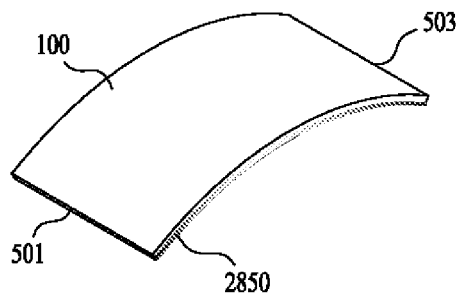

Referring to FIGS. 30C and 30D, in face-down mode, a user may conveniently disable/enable the face-down mode by adjusting an amount of an ambient light of the mobile terminal 100. Referring to FIG. 30C, when the mobile terminal 100 is in the face-down mode, if the controller 180 detects a preset event, the touchscreen 151 emits light. In doing so, if a user performs a gesture of covering an exterior of the mobile terminal 100 with a palm in order to disable the face-down mode, referring to FIG. 30D, the controller 180 detects the action of disabling the face-down mode and is then able to control the touchscreen 151 not to emit light. The controller 180 may measure a brightness of an ambient light using the sensing device 140, and more particularly, a photosensor. If the user covers the exterior of the mobile terminal 100 with a palm, the controller 180 may detect that the amount of the ambient light is reduced. If the controller 180 detects that the ambient light amount is less than or equal to a prescribed brightness level, the controller 180 may control the face-down mode of the mobile terminal 100 to be disabled. While the face-down mode is disabled, if the controller 180 detects the reduction of the ambient light amount, as shown in FIG. 30C, the controller 180 detects it as a command for enabling the face-down mode again and is then able to enable the face-down mode. In the case that the sensing device 140 includes a proximity sensor, the present embodiment may be applied to a case in which the controller 180 detects a proximity input to an outer surface of the mobile terminal through the proximity sensor.

According to the above description, the action shown in FIG. 30A or FIG. 30C is recognized as a command for enabling/disabling the face-down mode by the controller 180. Yet, according to another embodiment, the controller 180 may recognize the action shown in FIG. 30A or FIG. 30C as a command for adjusting at least one of the color and/or brightness of the light emitted by the touchscreen 151. For instance, as a preset event occurs in the mobile terminal 100, when the touchscreen 151 emits light in specific color and brightness under the control of the controller 180, if the controller 180 detects the action shown in FIG. 30A or FIG. 30C, the controller 180 may control the touchscreen 151 to emit light by adjusting at least one of the color and/or light of the light emitted by the touchscreen 151. In particular, while the touchscreen 151 emits light, if the controller 180 detects the action shown in FIG. 30A or FIG. 30C, the controller 180 may control the brightness of the light, which is emitted by the touchscreen 151, to be adjusted darker than that prior to the action detection. And, the controller 180 may adjust the corresponding brightness to get further darker depending on a maintained time of the detected action.

If the touchscreen 151 emits light, a user may confirm the preset event. In doing so, if the controller 180 detects the action shown in FIG. 30A or FIG. 30C, the controller 180 may control the touchscreen 151 to stop emitting light.

With regards to a user of the mobile terminal 100, if a preset event occurs, the touchscreen 151 emits light. Hence, the user may want to control the touchscreen 151 to stop emitting light in association with the corresponding event. Nonetheless, when the touchscreen 151 has a long light-emitting time or emits light repeatedly in a prescribed time interval, if a user performs the action shown in FIG. 30A or FIG. 30C, the controller 180 may control the touchscreen 151 to stop emitting the light. For instance, if the controller 180 is previously set to control the touchscreen 151 to emit light for 3 seconds by detecting a preset event, if a user performs the action shown in FIG. 30A or FIG. 30C while the touchscreen 151 emits light for 1 second, the controller 180 may control the touchscreen 151 to stop emitting the light irrespective of the preset time.

In a mobile terminal as embodied and broadly described herein, if a specific event occurs despite the mobile terminal being face down, a notification related to event occurrence may be to a user through a display. In particular, although the mobile terminal is face down, a user may recognize whether a specific event has occurred in the mobile terminal and may obtain further information on a type of the event and information on the number of occurrences of the event. A mobile terminal as embodied and broadly described herein may discriminate various information including event type, event occurrence number and the like in a manner of controlling the display to emit light by changing brightness or color of the light.

The above-described methods may be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

A mobile terminal and controlling method thereof are provided in which notifications related to an event occurrence may be provided to a user through a display in the case of an occurrence of a specific event in a state in which the mobile terminal is in a face down position.

A mobile terminal and controlling method thereof are provided in which a display emits light in a manner of changing its brightness, color, pattern or the like depending on a preset event in face-down mode.

A mobile terminal and controlling method thereof are provided in which a display is enabled to emit light in a manner that the mobile terminal recognizes a user's direction and then enables the user to recognize an occurrence of a preset event in the corresponding direction.

A mobile terminal, as embodied and broadly described herein, may include a first sensing unit configured to detect a face-down mode of the mobile terminal, a second sensing unit configured to detect a user designated direction around the mobile terminal, a touchscreen, and a controller controlling a prescribed portion of the touchscreen corresponding to the detected user designated direction to emit light in response to a preset event occurring in the face-down mode.

The second sensing unit detects the user designated direction by recognizing a sound around the mobile terminal.

The second sensing unit detects the user designated direction by recognizing a sound generated from an outer surface of the mobile terminal.

In another embodiment, a method of controlling a mobile terminal may include the steps of entering a face-down mode of the mobile terminal, setting a user designated direction around the mobile terminal, and controlling a prescribed portion of a touchscreen corresponding to the set user designated direction to emit light in response to a preset event occurring in the face-down mode of the mobile terminal.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
    at least one touchscreen light emitting device provided on at least one lateral side of the mobile terminal;
    a sensing device;
    a touchscreen provided on a front face of the mobile terminal; and
    a controller configured to detect, via the sensing device, that the mobile terminal is in a face-down mode;
    wherein the at least one touchscreen light emitting device is further configured to emit light toward a right direction or a left direction of the mobile terminal in response to at least one preset event while the mobile terminal is in the face-down mode, wherein the at least one preset event further includes an occurrence of a missed call from a first contact, wherein the controller is further configured to extend a light emitting region of the at least one touchscreen light emitting device in proportion to an amount of missed calls from the first contact while the mobile terminal is in the face-down mode, and wherein the controller is further configured to:
  detect, via the sensing device, a color of a surface that the front face of the mobile terminal faces in the face-down mode, and
  control the at least one touchscreen light emitting device to emit light of a different color complementary to the color of the surface in response to the at least one preset event while the mobile terminal is in the face-down mode.

2. The mobile terminal of claim 1, wherein the controller is further configured to detect that the mobile terminal is in the face-down mode when the sensing device senses a horizontal state of the mobile terminal for a preset time.

3. The mobile terminal of claim 1, wherein the sensing device located at a rear side of the mobile terminal includes at least one of a photosensor, a RGB sensor or an illumination sensor.

4. The mobile terminal of claim 1, wherein the controller is further configured to control the at least one touchscreen light emitting device to change at least one of a pattern or a wavelength of the emitted light according to the at least one preset event.

5. The mobile terminal of claim 1, wherein, if the face-down mode is not entered, the controller is further configured to control a whole area of the display to display an occurrence of the at least one preset event.

6. The mobile terminal of claim 1, wherein the sensing device includes at least one of a proximity sensor, a gyro sensor, an accelerometer sensor or a photosensor, wherein the face-down mode is a state that the mobile terminal is turned over with the front face facing down.

7. The mobile terminal of claim 1, wherein the at least one preset event is at least one event previously set by a user.

8. The mobile terminal of claim 1, wherein the controller is further configured to:
  adjust at least one of a brightness, a size or a pattern of the light depending on a type of the at least one preset event.

9. The mobile terminal of claim 8, wherein the controller is further configured to:
  control a specific region of the touchscreen to emit light in a first pattern in response to a first preset event, and
  control the specific region to emit light in a second pattern in response to a second preset event,
  wherein the at least one preset event includes the first preset event and the second preset event, the first preset event is different from the second preset event and the first pattern is different from the second pattern.

10. The mobile terminal of claim 9, wherein the first preset event is a call reception from a contact existing a second contact list and the second preset event is a message reception from the second contact.

11. The mobile terminal of claim 1, wherein, when an event which is different from the preset event is occurred, the controller is further configured to control the display not to emit light.

12. The mobile terminal of claim 1, wherein the sensing device includes a photosensor, and wherein the controller is further configured to:
  measure a reflectivity of the light emitted toward the surface in the face-down mode via the photosensor, and
  control the touchscreen to display information in an inverted manner in the face-down mode when the reflectivity is over a prescribed value.

* * * * *